United States Patent [19]

Yokomachi et al.

[11] Patent Number: 5,483,608
[45] Date of Patent: Jan. 9, 1996

[54] OPTICAL SWITCH FOR SWITCHING PLURAL OPTICAL FIBERS

[75] Inventors: Yukihiro Yokomachi; Kazuhito Saito; Kazuo Ikegaya, all of Yokohama; Nobuo Tomita, Higashiibaraki, all of Japan

[73] Assignees: Sumitomo Electric Industries, Ltd., Osaka; Nippon Telegraph & Telephone Corporation, Tokyo, both of Japan

[21] Appl. No.: 274,868

[22] Filed: Jul. 14, 1994

[30] Foreign Application Priority Data

Aug. 25, 1993 [JP] Japan .................................. 5-210442

[51] Int. Cl.⁶ .................................................. G02B 6/26
[52] U.S. Cl. ............................ 385/22; 385/15; 385/16; 385/17; 385/20; 385/24; 385/25; 385/31
[58] Field of Search .................... 385/15, 16, 17, 385/20, 21, 22, 23, 24, 25, 30, 31, 39

[56] References Cited

U.S. PATENT DOCUMENTS

| | | | |
|---|---|---|---|
| 4,189,206 | 2/1980 | Terai et al. | 385/16 X |
| 4,220,396 | 9/1980 | Antell | 385/25 X |
| 4,325,604 | 4/1982 | Witte | 385/25 X |
| 4,886,335 | 12/1989 | Yanagawa et al. | 385/16 X |
| 4,911,520 | 3/1990 | Lee | 385/16 X |
| 4,938,552 | 7/1990 | Jebens et al. | 385/16 X |
| 5,035,482 | 7/1991 | ten Berge et al. | 385/16 X |
| 5,056,886 | 10/1991 | Hoult | 385/20 |
| 5,098,207 | 3/1992 | Blomgren | 385/16 |
| 5,110,194 | 5/1992 | Zurfluh | 385/16 |
| 5,175,776 | 12/1992 | Lee | 385/16 |
| 5,239,599 | 8/1993 | Harman | 385/16 |

FOREIGN PATENT DOCUMENTS

| | | | |
|---|---|---|---|
| 3437489 | 4/1986 | Germany | 385/16 X |
| 3641707 | 6/1988 | Germany | 385/16 X |
| 54-28160 | 2/1979 | Japan | 385/16 X |
| 55-25023 | 2/1980 | Japan | 385/16 X |
| 55-43540 | 3/1980 | Japan | 385/16 X |
| 199016 | 4/1989 | Japan | 385/16 X |
| 2149806 | 6/1990 | Japan | 385/16 X |
| 8802869 | 4/1988 | WIPO | 385/16 X |
| 9205460 | 4/1992 | WIPO | 385/16 X |

*Primary Examiner*—Brian Healy
*Attorney, Agent, or Firm*—Cushman Darby & Cushman

[57] ABSTRACT

The present invention is to provide an optical switch that enables size reduction of the switch, facilitation of positioning of an optical fiber, simplification of the structure of an actuator, improvements in assembly operability and reliability of the apparatus, facilitation of an application to a multi-core structure, facilitation of alignment of a plurality of optical fibers, and the like. A displacement stage 5 for mounting a single optical fiber 2 thereon, an elevating stage 20 for mounting a plurality of second optical fibers 3 thereon in a lateral line, and a linear encoder 14 for controlling a coil motor 9 are disposed in a case 1. The displacement stage 5 is displaced by the coil motor in the horizontally lateral direction. Simultaneously, the elevating stage 20 is moved upward by the actuator 19, and the first optical fiber 2 is caused to abut against an arbitrary second optical fiber to selectively couple them, thereby switching the optical path of an optical fiber.

12 Claims, 20 Drawing Sheets

RELATIONSHIP BETWEEN GAP BETWEEN END FACES AND LOSS

CURRENT-DISPLACEMENT
CHARACTERISTICS $$R = \frac{\text{Ⓛ}^3}{\text{Ⓔ} \cdot \text{ⓑ} \cdot \text{ⓣ}^3} \cdot \frac{N \cdot \text{Ⓑ} \cdot \text{ⓛ}}{9.8} \cdot \frac{1}{1000}$$

$$\begin{cases} \text{NUMERATOR} \text{----} \bigcirc \times 4, \text{ } \bigcirc \times 1 \\ \text{DENOMINATOR} \text{----} \bigcirc \times 4, \text{ } \bigcirc \times 1 \end{cases}$$

$\delta = 1.278$ [dB]

$\delta = 0.088$ [dB]

OPTICAL SWITCH FOR SWITCHING PLURAL OPTICAL FIBERS

BACKGROUND OF THE INVENTION

1. Field of the Invention

The present invention relates to an improvement in the structure of an optical switch for switching the optical path of an optical fiber.

2. Related Background Art

As is well known, an optical switch is an optical device for switching the optical path of an optical fiber along the time axis or spatially, and is widely utilized in the fields of optical communication, optical information, applied optical measurement, and the like.

The fields of optical communication, optical information, applied optical measurement, and the like have made remarkable developments in recent years. Along with these developments, an optical circuit has become more and more complicated and has advanced functions. Accordingly, further downsizing is demanded for an optical device.

Optical switches briefly described above are usually classified into mechanical type optical switches disclosed in, e.g., Japanese Patent Laid-Open Nos. 1-99016, 55-43540, and 55-25023, U.S. Pat. No. 5,056,886, and Japanese Patent Laid-Open Nos. 54-28160 and 2-149806, and non-mechanical type optical switches.

An optical switch disclosed in Japanese Patent Laid-Open No. 1-99016 has a mechanical structure in which a selecting connector is fitted to the distal end portion of a single optical fiber, and selected connectors are fitted to the distal end portions of a plurality of optical fibers arranged in a matrix.

The optical switch having the above arrangement has a function of arbitrarily selecting one connector selected from the plurality of connectors to be selected and thereafter moving the selecting connector in the X-, Y-, and Z-directions and fitting and connecting it to the one opposing connector to be selected, thereby switching the optical path of the optical fiber.

The optical switches disclosed in Japanese Patent Laid-Open Nos. 55-43540 and 55-25023, and U.S. Pat. No. 5,056,886 have a mechanical structure in which the optical path of a fiber is switched by using a mirror, a prism, and the like.

The optical switch disclosed in Japanese Patent Laid-Open No. 54-28160 is constituted by a single optical fiber which is bent due to use of an electrostrictive material, and a plurality of optical fibers disposed in a substantially fan-shaped manner and each having one end portion directed to the distal end portion of the opposing single optical fiber.

This optical switch has a function of arbitrarily selecting one optical fiber from the plurality of optical fibers, bending the single optical fiber with use of the electrostrictive material, and thereafter connecting the distal end portion of the single optical fiber to one end portion of the selected optical fiber, thereby switching the optical path.

Furthermore, an optical switch disclosed in Technology Research Report OCS 90-26 of the Institute of Electronics and Communication Engineers of Japan has a mechanical structure in which a magnetic film pipe is fixed to a bendable single optical fiber by adhesion, this single optical fiber is bent by a magnetic force, and this single optical fiber is aligned with one of a plurality of optical fibers by using a guide groove, thereby switching the optical path of the optical fiber.

Furthermore, an optical switch disclosed in Japanese Patent Laid-Open No. 2-149806 has a mechanical structure in which optical fibers are inserted in a plurality of adapters that are arranged in a line, one adapter is arbitrarily selected from the plurality of adapters, a semi-circularly arcuated single optical fiber is moved by rotating a ball screw, the distal end portion of the single optical fiber is inserted into the selected adapter, and the selected optical fiber and the single optical fiber are connected, thereby switching the optical path.

As a non-mechanical type optical switch, a waveguide type optical switch using a material, e.g., $LiNbO_3$, a bulk type optical switch which deflects the optical path by using a liquid crystal or hologram, and the like exist.

Since the conventional optical switches have the above arrangements, they have several defects and problems as follows.

Since the optical switch disclosed in Japanese Patent Laid-Open No. 1-99016 utilizes selecting and selected connectors, a large fitting force must be applied to fit the connectors.

Accordingly, the housing of the switch must be formed of a strong material to maintain a large rigidity so that the housing can endure the fitting force. In addition, the switch becomes inevitably large.

In a detachable-connector optical switch of this type, the end face of the optical fiber can be polished for each connector to decrease reflection at the coupling portion. However, since the connectors must be connected to and disconnected from each other, an increase in size cannot be avoided.

In the optical switches disclosed in Japanese Patent Laid-Open Nos. 55-43540 and 55-25023 and U.S. Pat. No. 5,056,886, since alignment of the optical fiber requires high precision, an expensive, high-grade positioning mechanism must be provided as an actuator. The assembly operability of the system cannot be improved, and the system is very weak against vibration and the like, thus lacking reliability.

In the optical switch disclosed in Technology Research Report OCS 90-26 of the Institute of Electronics and Communication Engineers of Japan, although the positioning precision of the actuator can be coarse, the optical switch cannot be directly applied to and utilized at all in a multi-core structure having three or more cores.

In the optical switch disclosed in Japanese Patent Laid-Open No. 2-149806, the plurality of optical fibers must be arranged highly precisely.

Furthermore, the non-mechanical optical switches described above have problems of a large loss, large crosstalk, large polarization dependency or wavelength dependency, and the like that cannot be neglected in terms of reliability.

Meanwhile, in addition to the above defects described in detail, the conventional optical switches require a sensor for position detection. When this sensor is housed in the switch, problems arise, e.g., the size is increased, the electric wiring is complicated, and the cost is increased.

Since a mechanism (nonvolatile function) for stably maintaining coupling when power is not supplied is added to the conventional optical switches, an increase in size cannot be avoided.

SUMMARY OF THE INVENTION

The present invention has been made in view of the above situation, and has as its object to provide an optical switch capable of decreasing the size of the switch, facilitating alignment of the optical fiber, simplifying the structure of the actuator, improving the assembly operability and reliability of the system, facilitating application to a multi-core structure, facilitating arrangement of a plurality of optical fibers, and the like.

In order to achieve the above object, the first aspect of the present invention comprises a first stage for mounting a first optical fiber thereon, a second stage for mounting thereon a plurality of second optical fibers opposing the first optical fiber by V shaped grooves in an aligned state, first driving mechanism for displacing the first stage in an aligning direction of the plurality of second optical fibers during optical path switching, controller for detecting a displacement amount of the first stage and controlling the first driving mechanism, and second driving mechanism for moving the second stage upward during optical path switching to selectively couple the first optical fiber with an arbitrary second optical fiber among the plurality of second optical fibers in a V shaped groove, thereby switching an optical path of an optical fiber.

In order to achieve the above object, the second invention of the present invention comprises a first stage for mounting a first optical fiber thereon, a second stage for mounting thereon a plurality of second optical fibers opposing the first optical fiber, in an aligned state, first driving mechanism for displacing the first stage in an aligning direction of the plurality of second optical fibers during optical path switching, and second driving mechanism for moving the second stage upward during optical path switching to selectively couple the first optical fiber with an arbitrary second optical fiber among the plurality of second optical fibers in a V shaped groove, thereby switching an optical path of an optical fiber, wherein a displacement amount of the first stage is controlled based on a balance of a restoration force generated proportionally to the displacement and a force generated by the first driving mechanism, and that the first stage is provided with an elastic body, sandwiched between the second stage and the second driving mechaniss during optical path switching, for fixing a position of the first stage.

In order to achieve the above object, the third aspect of the present invention comprises a first stage for mounting a first optical fiber thereon, a second stage for supporting the first stage to be vertically movable, a third stage for mounting a plurality of second optical fibers opposing the first optical fiber thereon in an aligned state, first driving mechanism for displacing the second stage in an aligning direction of the plurality of second optical fibers during optical path switching, second driving mechanism for moving the first stage downward during optical path switching to selectively couple the first optical fiber with an arbitrary second optical fiber among the plurality of second optical fibers in a V shaped groove, thereby switching an optical path of an optical fiber, and a positioning body, provided to the third stage and sandwiched between the first stage and the second driving mechanism during optical path switching, for fixing a position of the second stage.

According to the first aspect of the present invention having the above arrangement, during optical path switching of an optical fiber, the first stage mounting the first optical fiber thereon is displaced in the horizontally lateral direction under the control of the controller based on driving by the first driving mechanism. Thereafter, the second stage mounting the plurality of second optical fibers thereon is moved upward based on driving by the second driving mechanism, and the flexed first optical fiber and the arbitrary second optical fiber are coupled as they oppose each other in the V-groove of the coupling stage, thereby switching the optical path of the optical fiber.

According to the second aspect of the present invention having the above arrangement, during optical path switching of an optical fiber, the first stage mounting the first optical fiber thereon is displaced in the horizontally lateral direction based on driving by the first driving mechanism, and the displacement amount of the first stage is controlled based on the balance of the restoration force generated proportionally to the displacement and the force generated by the first driving mechanism. Subsequently, the second stage mounting the plurality of second optical fibers thereon is moved upward based on driving by the second driving mechanism. The elastic body is sandwiched between the second stage and the second driving mechanism to fix the position of the displacement stage. Thereafter, the flexed first optical fiber and the arbitrary second optical fiber are coupled as they oppose each other in the V shaped groove of the coupling stage, thereby switching the optical path of the optical fiber.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Figure 1:
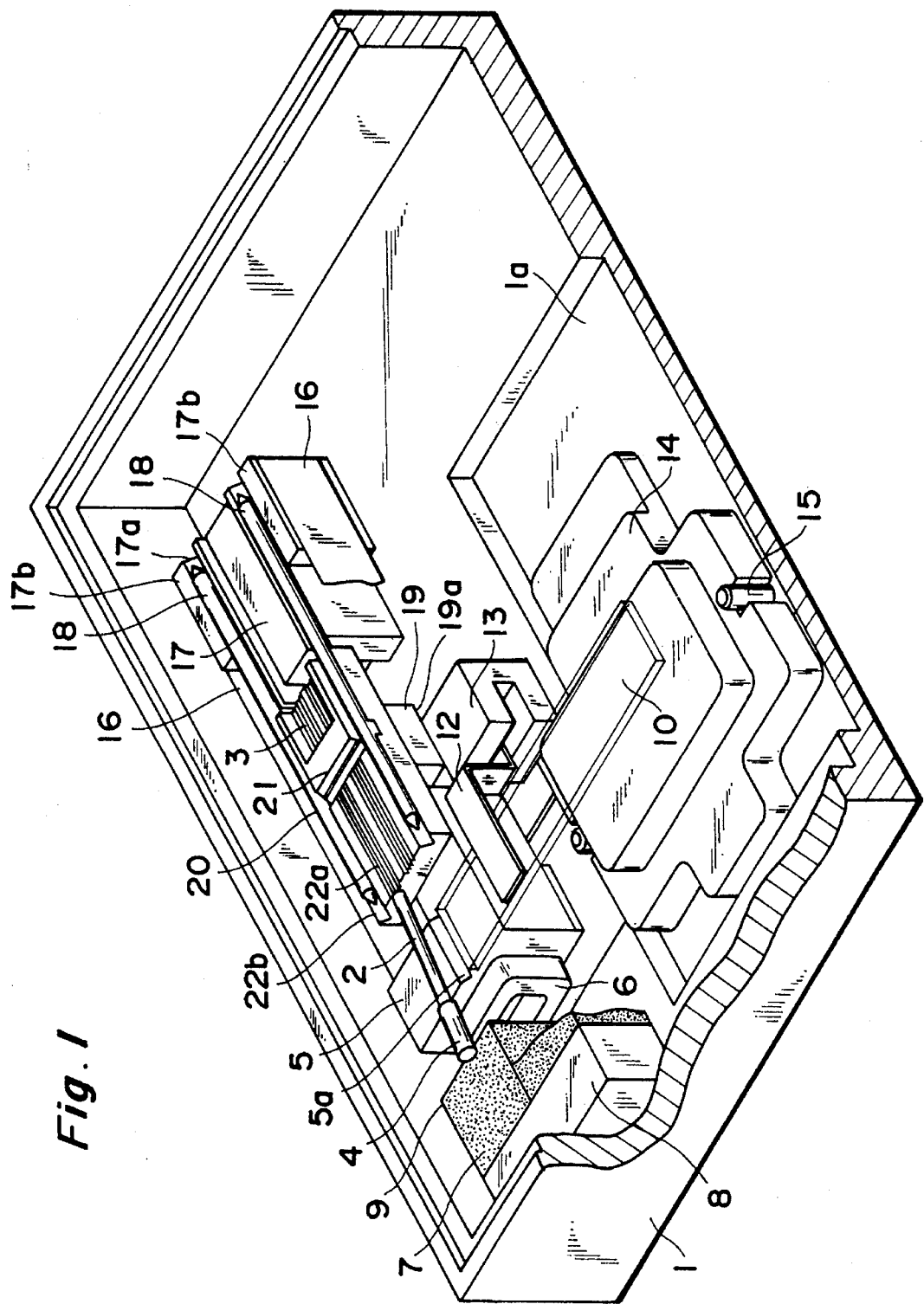
FIG. 1 is an overall perspective view showing an embodiment of an optical switch according to the first invention of the present invention.

The basic foreign Applications filed on May 15 in 1994; No. 4-123,750, filed on Jun. 16 in 1994, No. 4-156,667; and filed on Jun. 16 in 1994, No. 4-156,669;

The first aspect of the present invention will be described in detail by way of the first embodiment shown in FIGS. 1 to 6.

In a 1×8 optical switch according to the first aspect of the present invention, a displacement stage 5 mounting a first optical fiber 2 thereon, an elevating stage 20 mounting a plurality of second optical fibers 3 thereon, and a linear encoder 14 are disposed in a case 1. The displacement stage 5 is displaced by a coil motor 9 in the horizontal direction, and the elevating stage 20 is moved upward by an actuator 19 to couple the first optical fiber 2 with an arbitrary second optical fiber, thereby switching the optical path of the optical fiber.

As shown in FIG. 1, the case 1 has a rectangular box(for example, size: 20 mm×50 mm×9 mm) structure having an open upper surface. Silicone oil (refractive index matching agent) (not shown) for matching the cores at the coupling surfaces of the first optical fiber 2 and the arbitrary second optical fiber is filled in the case 1. A lid (not shown) is detachably fitted on the upper surface of the case 1.

As shown in FIG. 1, the first optical fiber 2 having flexibility consists of a single optical fiber inclinedly extending from the left to the right side of FIG. 1, and is inserted in a fixing master ferrule 4 having an almost cylindrical shape.

As shown in FIG. 1, the displacement stage 5 is formed of a non-permeable material as a substantially rectangular armature. A single mount groove 5a is formed in the central portion of the inclined upper surface of the displacement stage 5 to have a V shape. The displacement stage 5 is housed and arranged at the left side in the case 1 such that it is displaceable in the horizontally lateral direction, in other words, in an aligning direction of the plurality of second optical fibers 3.

The single mount groove 5a extends in the oblique left-to-right direction in FIG. 1 and mounts the master ferrule 4 therein in an inclinedly fixed state. As the master ferrule 4 is mounted in the mount groove 5a, the free end portion of the first optical fiber 2 which has moved downward is located at a lower position.

The single first optical fiber 2 is mounted such that its free end portion is fitted in a V-shaped groove 22a of a coupling stage 22 in a flexed state when the elevating stage 20 is moved upward (when the optical path of the optical fiber is to be switched).

As shown in FIG. 1, a coil (voice coil) 6 wound in a substantially O-shaped manner is mounted to the rear surface portion of the displacement stage 5. A pair of permanent magnets 7 oppose the coil 6 through a small gap.

Figure 2:
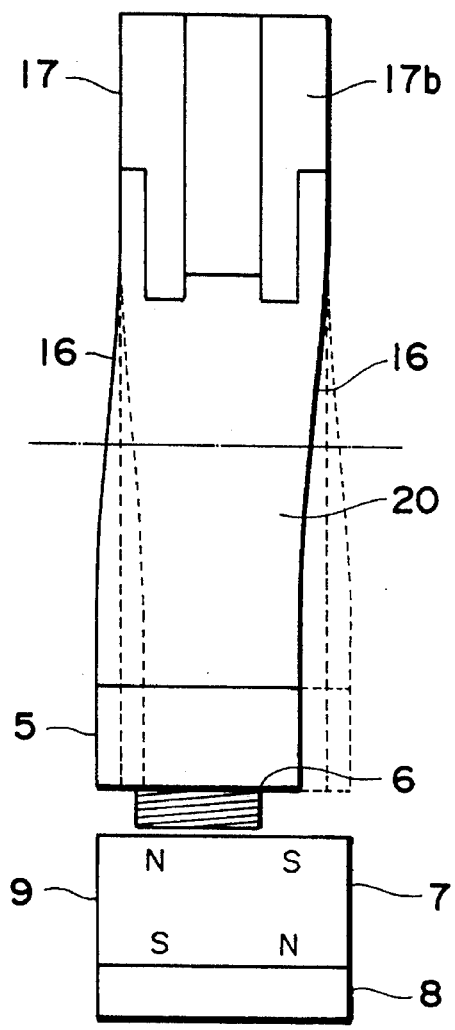
FIG. 2 is a plan view showing the main part of the embodiment of an optical switch according to the first aspect of the present invention.

As shown in FIGS. 1 and 2, the pair of permanent magnets 7 are aligned at the left side in the case 1 in a lateral line. The N and S poles at the front surfaces of the permanent magnets 7 oppose the coil 6. The rear surface portions of the permanent magnets 7 overlap a yoke (iron core) 8 forming a magnetic path.

As shown in FIG. 1, the yoke 8 is arranged at the left side in the case 1 and constitutes the coil motor 9 serving as the first driving means together with the displacement stage 5 serving as the armature, the coil 6, and the pair of permanent magnets 7.

The coil motor 9 is driven upon reception of power and displaces the displacement stage 5 mounting the first optical fiber 2 thereon in the horizontally lateral direction, in other words, in the aligning direction of the plurality of second optical fibers 3.

A glass scale 10 extending obliquely forward on the sheet of FIG. 1 is horizontally mounted to the upper surface portion of the displacement stage 5. The upper portion of a substantially Z-shaped light-shielding plate 12 for shielding passage of light rays is mounted to the glass scale 10. The lower portion of the light-shielding plate 12 is inserted in the inner space of a substantially U-shaped origin sensor 13 to be displaceable The origin sensor 13 is arranged in the case 1. When the light-shielding plate 12 is displaced, the origin sensor 13 always detects the displacement amount and position of the displacement stage 5 and outputs the detection values to the linear encoder (control means) 14.

The linear encoder 14 is arranged in a recessed surface portion 1a in the case 1 with a pair of attaching pins 15. The linear encoder 14 obtains the position of the displacement stage 5 based on the detection values supplied from the origin sensor 13 and controls power supply to the coil 6, thereby servo-controlling the coil motor 9.

Leaf springs 16 for regulating the range of displacement of the displacement stage 5 are mounted to the two side surface portions of the displacement stage 5. The pair of leaf springs 16 are mounted to spacers 17b at the two side surface portions of a stationary block 17.

The stationary block 17 is arranged at the right side in the case 1. Mount grooves 17a extending in the oblique direction of FIG. 1 are horizontally formed in the two sides of the upper surface of the stationary block 17. Positioning guide pins (pins) 18 extending in the same direction are horizontally mounted in the pair of mount grooves 17a in a fitted state.

Parts of the pair of guide pins 18 project from the stationary block 17 in the oblique direction of FIG. 1. As shown in FIGS. 1 and 2, the actuator (second driving means) 19 located between the pair of leaf springs 16 is disposed between the stationary block 17 and the displacement stage 5.

As shown in FIG. 1, the elevating stage 20 is constituted by a stationary stage 21 and the coupling stage 22 to have a plate-like shape and arranged in a space surrounded and defined by the pair of leaf springs 16, the stationary block 17, and the displacement stage 5. When the optical path of the optical fiber is to be switched, the elevating stage 20 is moved upward from a normal lower position as it is driven by the actuator 19.

The plurality of positioning V-shaped grooves 21a are formed by cutting in the surface of the stationary stage 21 in a lateral line at a pitch of 0.25 mm. Positioning grooves 21b are formed by cutting to locate at the two side portions of the stationary stage 21. The guide pins 18 are engaged with the pair of positioning grooves 21b in a fitted state.

Meanwhile, the coupling stage 22 is provided in the front portion of the stationary stage 21 to be the same level as and integral with it. The plurality of positioning/coupling V-shaped grooves 22a are formed in the surface of the coupling stage 22 by cutting in a lateral line at a pitch of 0.25 mm. The plurality of V-shaped grooves 22a communicate with the plurality of V-shaped grooves 21a of the stationary stage 21.

Positioning grooves 22b are formed in the two side portions of the surface of the coupling stage 22 by cutting, and the guide pins 18 are engaged with the pair of positioning grooves 22b in a fitted state.

When the optical path of the optical fiber is to be switched, the coupling stage 22 causes the free end portion of the first optical fiber 2, flexed by the corresponding V-shaped groove 22a of the coupling stage 22, to abut against the free end portion of an arbitrary second optical fiber, and couples them.

The plurality of second optical fibers 3 having flexibility consist of eight optical fibers horizontally extending from the right to the left side of FIG. 1 and are wrapped in a belt-like cable 23 as they are aligned in a lateral line. The second optical fibers 3 are fitted in the plurality of V-shaped grooves 21a of the stationary stage 21 in a stationary state so that they are aligned.

Figure 3:
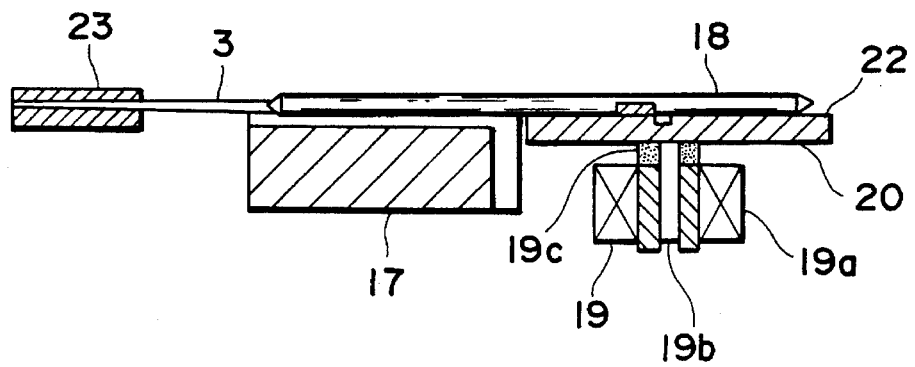
FIG. 3 is a sectional side view showing a current OFF state of an actuator in the optical switch according to the first aspect of the present invention.
Figure 4:
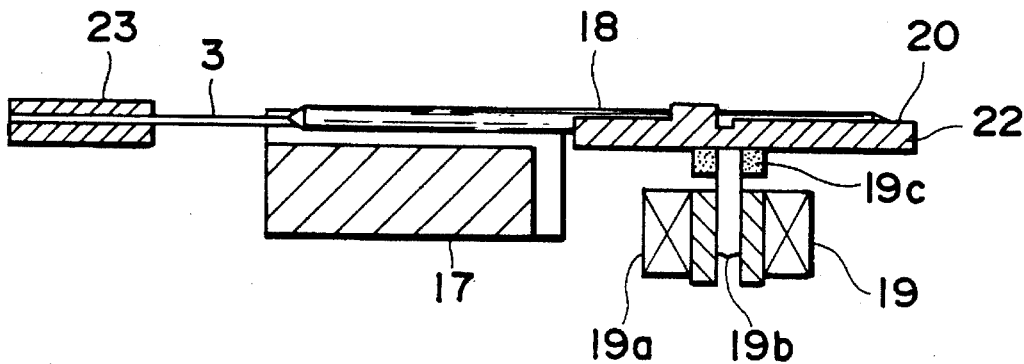
FIG. 4 is a sectional side view showing a current ON state of the actuator in the optical switch according to the first aspect of the present invention.

As shown in FIGS. 3 and 4, in the actuator 19, a coil 19a that generates a repulsive force upon reception of power is arranged in a space surrounded and defined by the pair of leaf springs 16, the stationary block 17, and the displacement stage 5.

A permanent magnet rod 19b having a permanent magnet is inserted in the vertical hole at the central portion of the coil 19a to be vertically movable. The elevating stage 20 is horizontally disposed on a permanent magnet portion 19c at the top of the permanent magnet rod 19b.

When the optical path of the optical fiber is not to be switched, the actuator 19 moves the elevating stage 20 downward to separate the first optical fiber 2 from the plurality of second optical fibers 3. When the optical path of the optical fiber is to be switched, the actuator 19 moves the elevating stage 20 upward to cause the first optical fiber 2 to abut against the plurality of second optical fibers 3, and mounts and supports the free end portion of the first optical fiber 2 in the V-shaped groove 22a of the coupling stage 22 in a flexed state.

The loss of an optical switch used in optical communication and the like is generally different from one core to another. The loss is caused by an assembly operation, like inclusion of dust, an abnormality of the end face state of an optical fiber, and the like, and by the structure, like axial misalignment, angular misalignment, a gap, and the like.

In the optical switch according to the present invention, since the first optical fiber 2 and an arbitrary second Optical fiber are coupled and axially aligned by utilizing the V-shaped grooves 22a, the axial misalignment and angular misalignment described above do not theoretically occur.

Regarding the gap, however, since the leaf springs 16 are used, a gap variation occurs as the leaf springs 16 are flexed, causing loss variations from one core to another. Therefore, the loss variation must be suppressed by a suppressing means to be described below.

Figure 5:
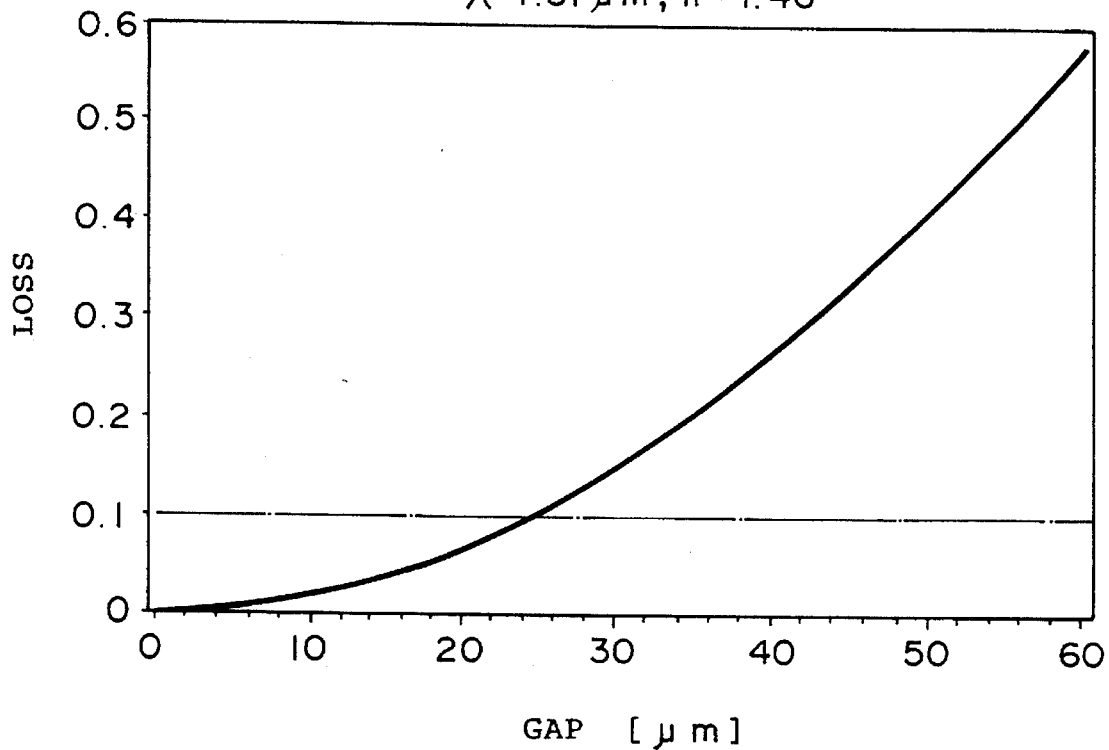
FIG. 5 is a graph showing the relationship between the gap between the end faces and the loss in the optical switch according to the first aspect of the present invention.

According to Marcuze(person's name) in the article entitled "LOSS ANALYSIS OF SINGLE MODE FIBER SPLICES" in The Bell System Technology, vol. 56, No.5(1977), when a gap is present between optical fibers, a transmission coefficient T obtained when light passes through the gap is expressed by the following equation:

[Equation 1]
$$T = \frac{1}{\frac{D^2}{n^2 k^2 w^2} + 1} \quad (1)$$

where n: refractive index of the gap $k = 2\pi/\lambda$ $\lambda$: wavelength of light w: radius of mode field of light propagating in the optical fiber FIG. 5 shows a graph showing loss with respect to the gap based on equation (1). From this graph, it is apparent that to decrease the loss to 0.1 dB or less, the gap must be set to 25 μm or less.

The losses required by optical devices in optical communication and the like vary. Generally, if a device has a loss of about 0.1 dB, its application scope is considerably large. More specifically, an optical switch, even if its loss varies from one core to another, can be sufficiently used if the absolute value of its loss is 0.1 dB or less.

Figure 6:
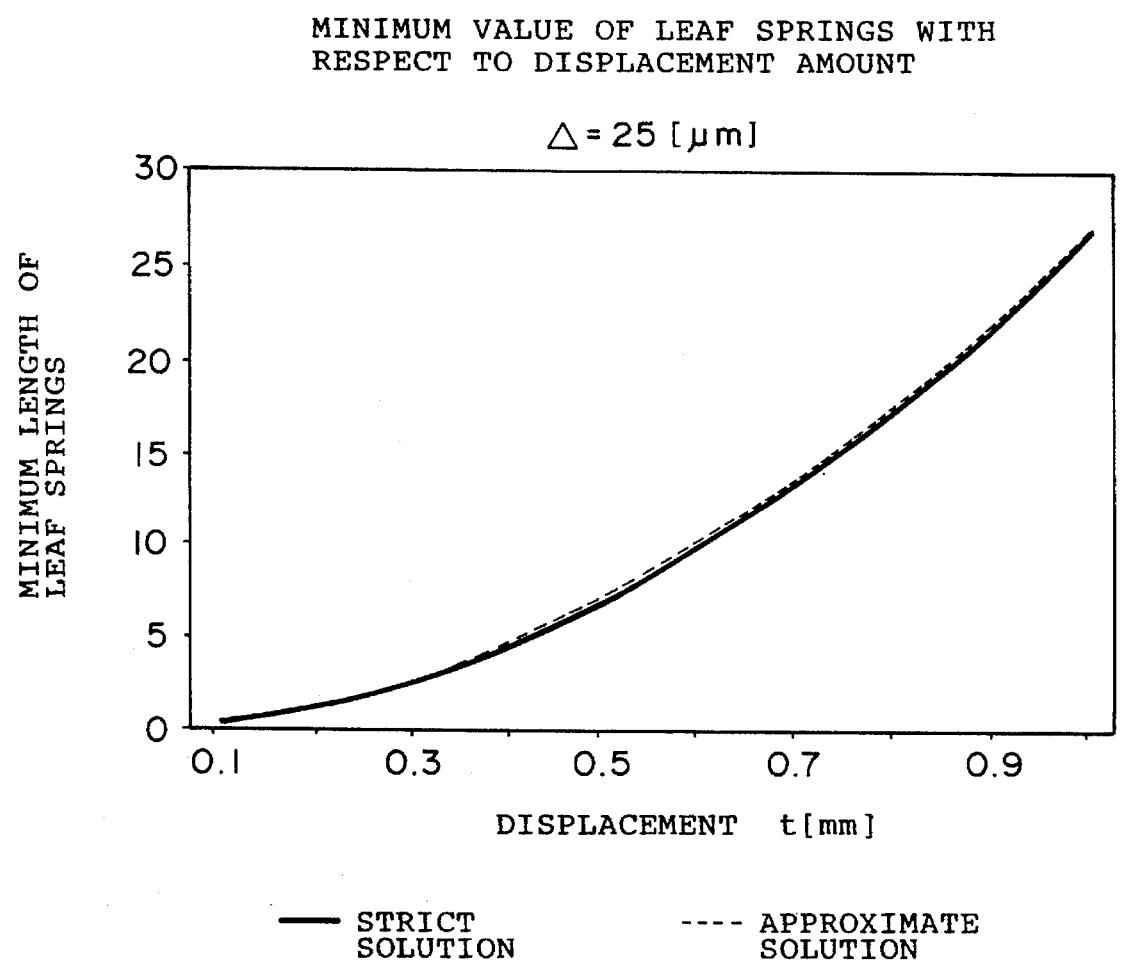
FIG. 6 is a graph showing the minimum value of the leaf springs with respect to the displacement amount of the optical switch according to the first aspect of the present invention.

A means of regulating the length of the leaf springs 16 so that the absolute value of the loss becomes 0.1 dB or less in all the cores, i.e., so that the variation in the gap between the optical fibers becomes 25 μm or less, will be described hereinafter with reference to FIG. 6.

A variation in the gap caused by displacement of the leaf springs 16 is determined by the size of displacement and the length of the leaf springs 16. Assuming that the maximum displacement amount of the leaf springs 16 is t and that the gap obtained with the maximum displacement is 25 μm, if t is on the order of about 1 mm, the minimum necessary length of the leaf springs 16 is approximately given by the following equation:

[Equation 2]
$$L = 27t^2 \quad (2)$$

More specifically, when the length of the leaf springs 16 is set longer than L given by equation (2), the displacement amount of the gap can be suppressed to 25 μm or less.

In the 1×8 optical switch of this embodiment, since the plurality of V-shaped grooves are formed by cutting in a lateral line at a pitch of 0.25 mm, the maximum displacement amount of the leaf springs 16 is ±0.875 mm. Accordingly, the length of the leaf springs 16 may be set to 20.7 mm or more based on equation (2). In this embodiment, the length of the leaf springs 16 is set to 30 mm.

The operation will be described. To switch the optical path by coupling the first optical fiber 2 and a selected arbitrary second optical fiber, first, the actuator 19 and the coil motor 9 are powered off.

Then, the permanent magnet rod 19b is moved downward to restore the elevating stage 20 to the separate position, thereby separating the plurality of second optical fibers 3 and the first optical fiber 2, so they will not contact each other. The displacement stage 5 which has been displaced in the horizontally lateral direction is restored to the normal position (the position shown in FIG. 1) by the restoring function of the pair of flexed leaf springs 16.

At this time, as power supply is turned off, the coil motor 9 is set free. Since the first optical fiber 2 and the plurality of second optical fibers 3 are separated from each other, damage caused by contact by the first optical fiber 2 can be prevented.

When the displacement stage 5 is restored to the normal position in this manner, power is supplied to the coil motor 9 to perform driving. Then, the displacement stage 5 is displaced from the normal position to a predetermined position while flexing the pair of leaf springs 16, and the first optical fiber 2 is located immediately above the arbitrary second optical fiber.

At this time, the light-shielding plate 12 is displaced to cause the origin sensor 13 to detect the displacement amount of the displacement stage 5, and a detection amount detected by the origin sensor 13 is output to the linear encoder 14. When the detection value is output from the origin sensor 13 to the linear encoder 14, the linear encoder 14 obtains the displacement amount of the displacement stage 5 and controls power supply to the coil 6, thereby servo-controlling the coil motor 9.

When the two optical fibers 2 and 3 are to be axially aligned by a corresponding V-shaped groove 22a, since the allowance of axial misalignment in the lateral direction is ±20 μm, the linear encoder 14 servo-controls the coil motor 9 so that the first optical fiber 2 is located within the range of ±20 μm of the target position.

When the first optical fiber 2 is located within the range of ±20 μm of the target position in this manner, power is supplied to the actuator 19. Then, the permanent magnet rod 19b is moved upward to move the elevating stage 20 upward to the contact position, and the guide pins 18 are engaged with the pair of positioning grooves 21b and 22b of the elevating stage 20 in the fitted state, so that the guide pins 18 are positioned.

The first optical fiber 2 and the arbitrary second optical fiber oppose each other at a position where they can contact each other. Simultaneously, the free end portion of the first optical fiber 2 is mounted and supported in the V-shaped groove 22a of the coupling stage 22 in the flexed fitting state so that the first optical fiber 2 and the arbitrary second optical fiber are coupled in this V-shaped groove 22a, thereby switching the optical path of the optical fiber.

In this coupling, the linear encoder 14 servo-controls the coil motor 9 so that the position of the first optical fiber 2 is located within the range of ±20 μm with respect to the position of the second optical fiber.

According to the above arrangement, since a selecting connector and a selected connector are not utilized, any large fitting force need not be effected for fitting the connectors. Therefore, the necessity of forming the box of the switch from a rigid material to ensure a large rigidity so that the box can endure the fitting force can be reliably eliminated.

Since the leaf springs 16 are used, further downsizing of the optical switch can be expected. More specifically, the optical switch can be reduced to a small size having a width of 34 mm× a depth of 50 mm× a height of 9 mm.

Since the glass scale 10 is horizontally mounted on the upper surface portion of the displacement stage 5 and the origin sensor 13 is arranged in the case 1, the weight of the displacement stage 5 can be reduced, and reduction of the driving force, in other words, a decrease in power consumption and size can be expected.

Since the first optical fiber 2 and the arbitrary second optical fiber are coupled in the V-shaped groove 22a, the positioning precision can be coarse, thereby eliminating the necessity of providing an expensive, high-grade positioning mechanism to the actuator 19.

Since the stationary and coupling stages 21 and 22 of the elevating stage 20 are integrally formed, downsizing can be achieved, and positioning of the V-shaped groove and the connectors can be avoided.

Since the structure can be easily assembled, the assembly operability can be improved. Furthermore, even when a positional variation occurs due to vibration or the like, if the positional variation is within the allowable range of the V-shaped groove 22a, the variation in the optical intensity can be suppressed by servo control of the coil motor 9 based on the linear encoder 14.

Positioning precision of the actuator 19 can be coarse, and an application to a multi-core structure having three or more cores can be expected.

Since this optical switch is not of a non-mechanical type but of a mechanical type, problems, e.g., large crosstalk and large polarization dependency and wavelength dependency that cannot be neglected in terms of reliability can be solved.

Since the silicone oil for matching the cores at the coupling surfaces of the first optical fiber 2 and the arbitrary second optical fiber is filled in the case 1, a loss at the coupling surfaces of the first optical fiber 2 and the arbitrary second optical fiber can be prevented.

The above embodiment shows a 1×8 optical switch. However, the number of first optical fiber 2 can be increased to m, and the number of the plurality of second optical fibers 3 can be increased to m×n, thereby constituting an m-core batch type optical switch.

In this case, a refractive index matching agent, e.g., silicone oil, that matches the cores of the optical fibers may be filled in the case 1 of the m-core batch type optical switch, thereby providing the same function and effect as those of the above embodiment.

In the above embodiment, the linear encoder 14 having reading precision on the order of several mm is used. However, a linear encoder 14 having reading precision on the order of 1 µm or less may be used.

In the above embodiment, the displacement stage 5 is displaced by the coil motor 9. However, the displacement stage 5 may be operated by, e.g., a combination of a linear guide and the coil motor 9, as a matter of course.

Figure 7:
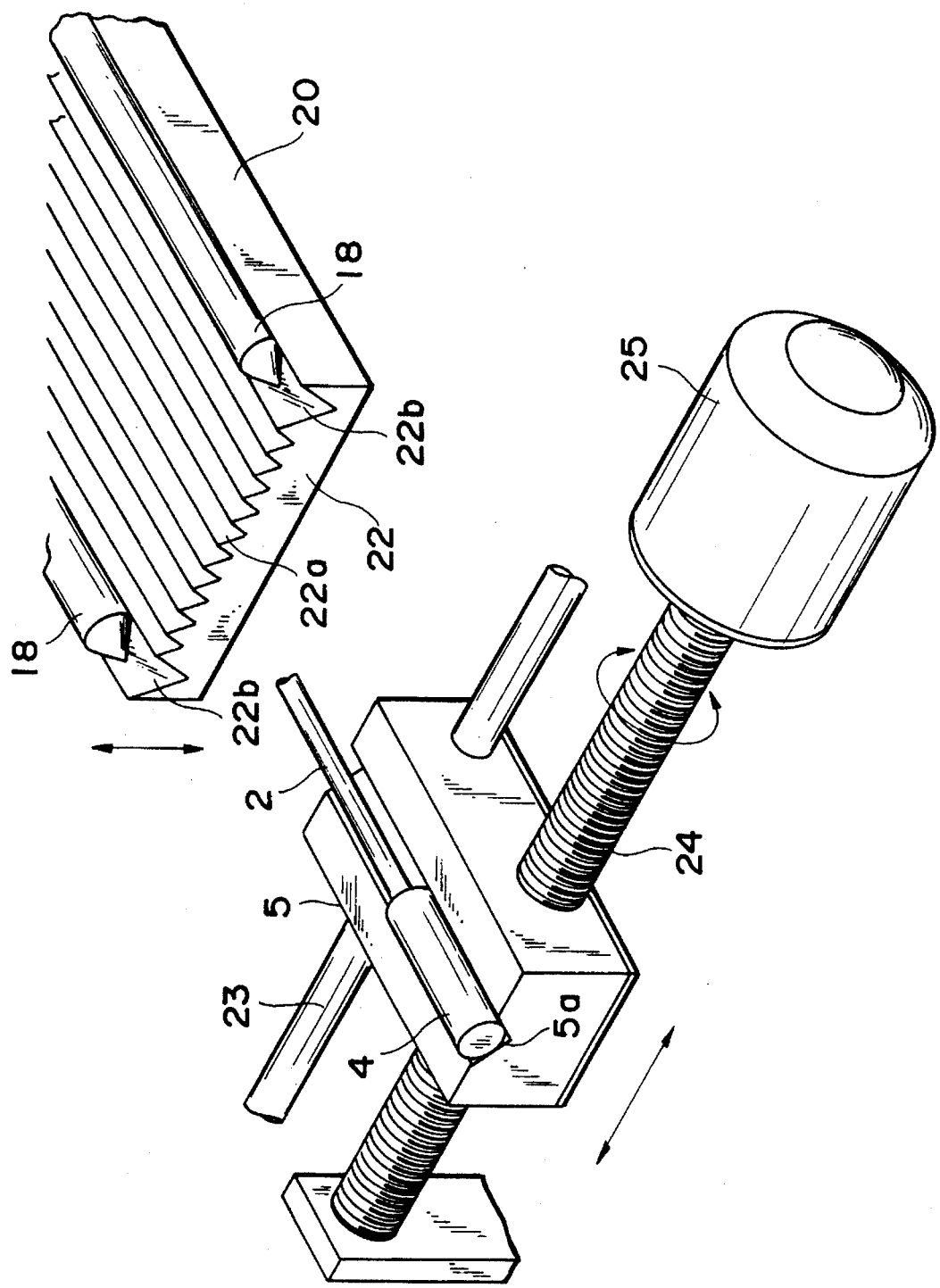
FIG. 7 is a perspective view showing the main part of another embodiment of the optical switch according to the first aspect of the present invention.
Figure 8:
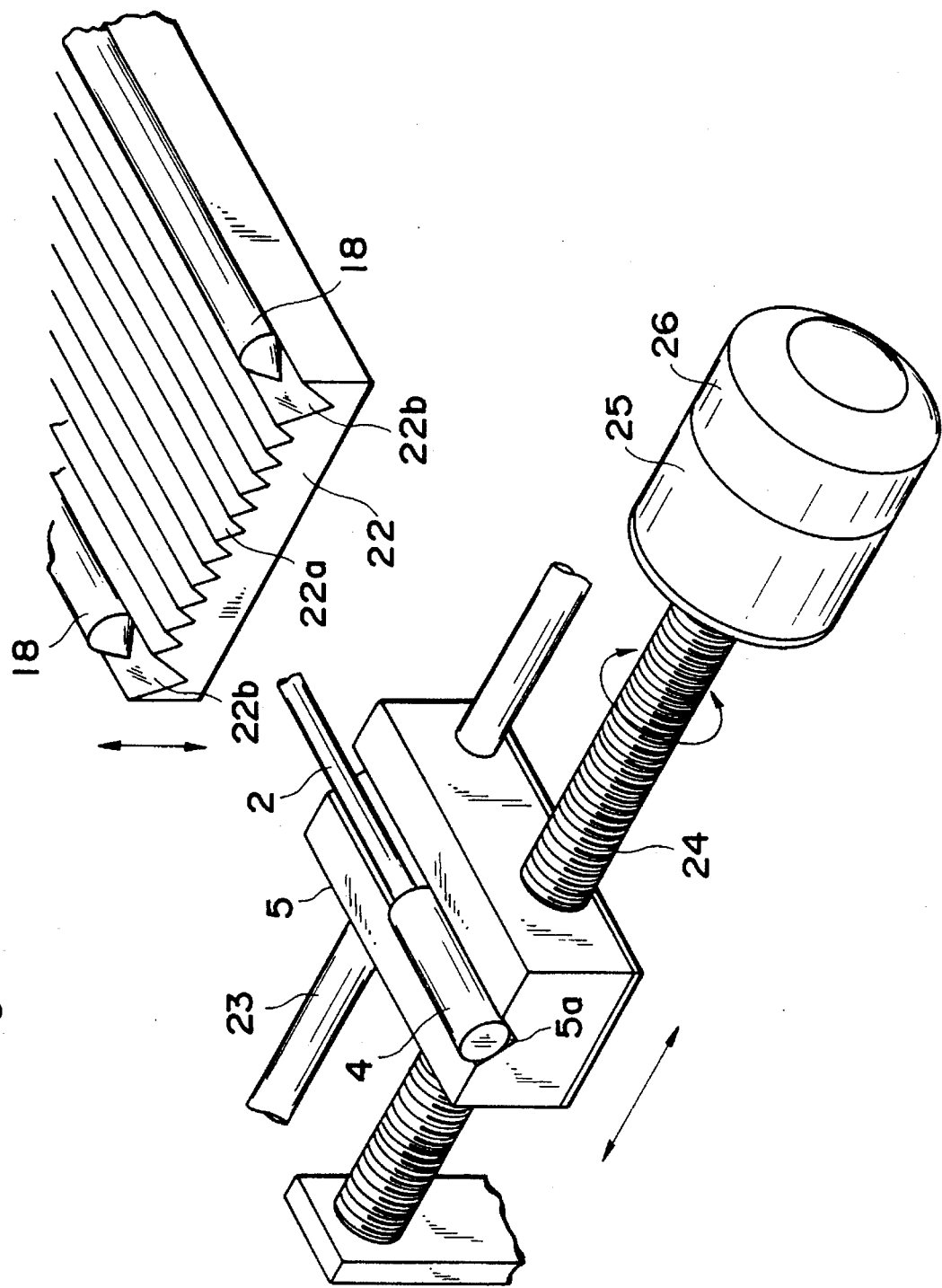
FIG. 8 is a perspective view showing the main part of still another embodiment of the optical switch according to the first aspect of the present invention.

In the above embodiment, the displacement stage 5 is displaced by the coil motor 9. However, the displacement stage 5 may be operated by, e.g., a combination of the linear guide 23, a ball screw 24, and a stepping motor 25, as shown in FIG. 7, or by a combination of the linear guide 23, a ball screw 24, a DC motor 25, and an encoder 26, as shown in FIG. 8.

In the above embodiment, the elevating stage 20 is vertically moved by the actuator 19. However, even if the first optical fiber 2 or the second optical fiber 3 is vertically moved by the actuator 19 so that they are coupled to each other, the same function and effect as those of the above embodiment can be expected.

The second aspect of the present invention will be described in detail by way of an embodiment shown in FIGS. 9 to 29.

In an optical switch according to the second aspect of the present invention, a displacement stage 5 mounting a plurality of first optical fibers 2 thereon and an elevating stage 20 mounting a plurality of second optical fibers 3 thereon are disposed in a case 1A. The displacement amount of the displacement stage 5 is controlled based on the balance of a restoration force generated proportionally to the displacement amount and the force of a coil motor 9. An elastic body 32 for fixing the displacement stage 5 is provided to project from the displacement stage 5.

Figure 9:
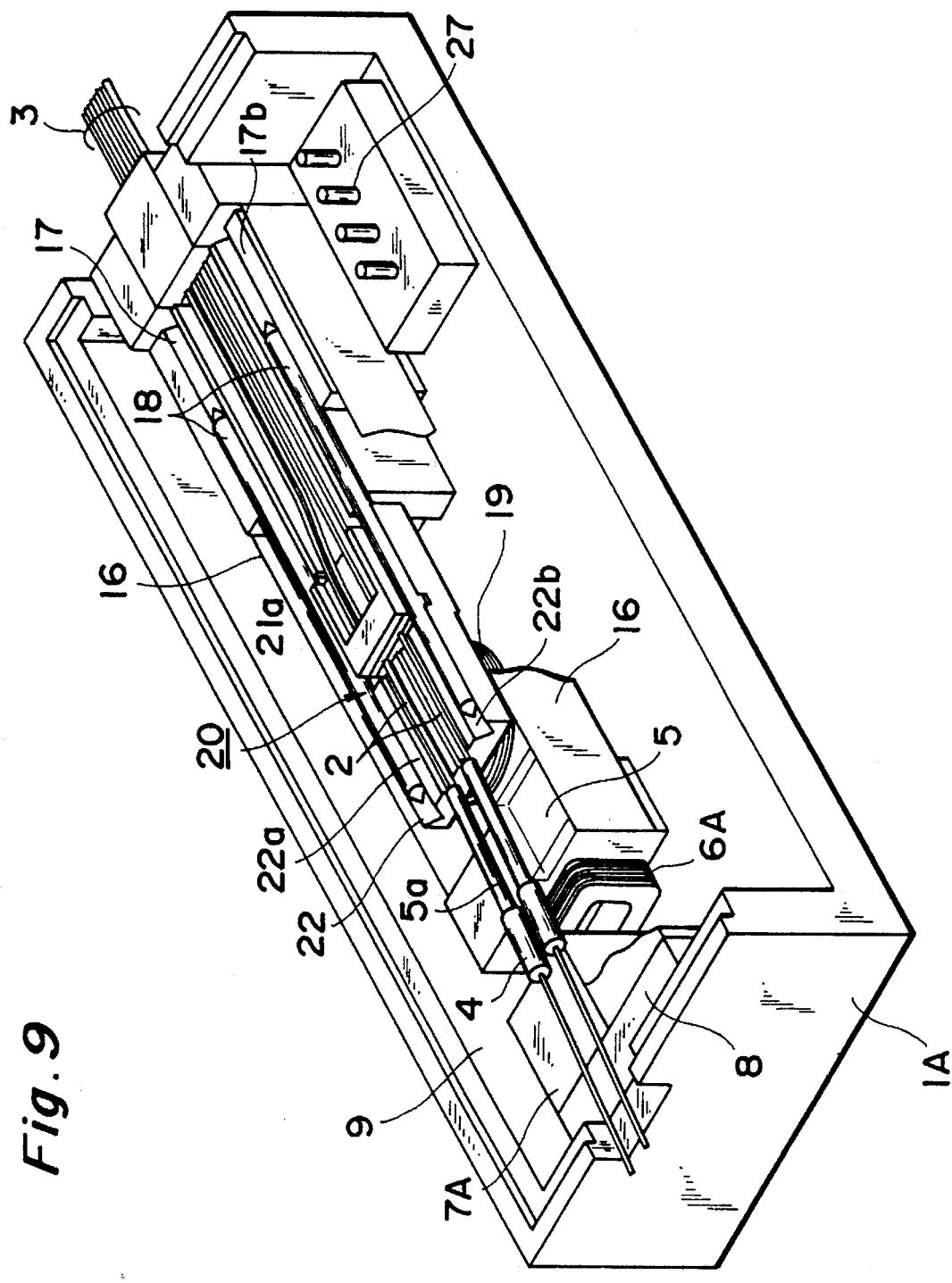
FIG. 9 is an overall perspective view showing an embodiment of an optical switch according to the second aspect of the present invention.

As shown in FIG. 9, the case 1A is formed to have a rectangular elongated box structure (more specifically, a length of 50 mm× a width of 20 mm× a thickness of 9 mm) having an open upper surface. Silicone oil (refractive index matching agent) (not shown) for matching the cores at the coupling surfaces of the plurality of first optical fibers 2 and the plurality of arbitrary second optical fibers 3 is filled in the case 1A. A lid (not shown) is detachably fitted on the upper surface of the case 1A.

As shown in FIG. 9, the first optical fibers 2 having flexibility consist of two optical fibers inclinedly extending from the left to the right side in FIG. 9. These two optical fibers are inserted in fixing master ferrules 4 having substantially cylindrical shapes.

Figure 10:
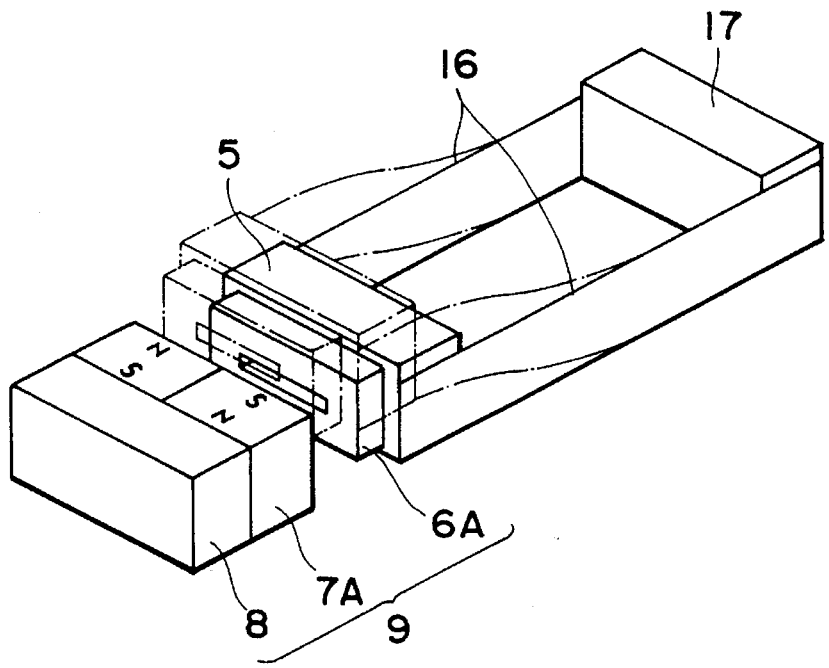
FIG. 10 is a perspective view showing the main part of the embodiment of the optical switch according to the second aspect of the present invention.
Figure 11:
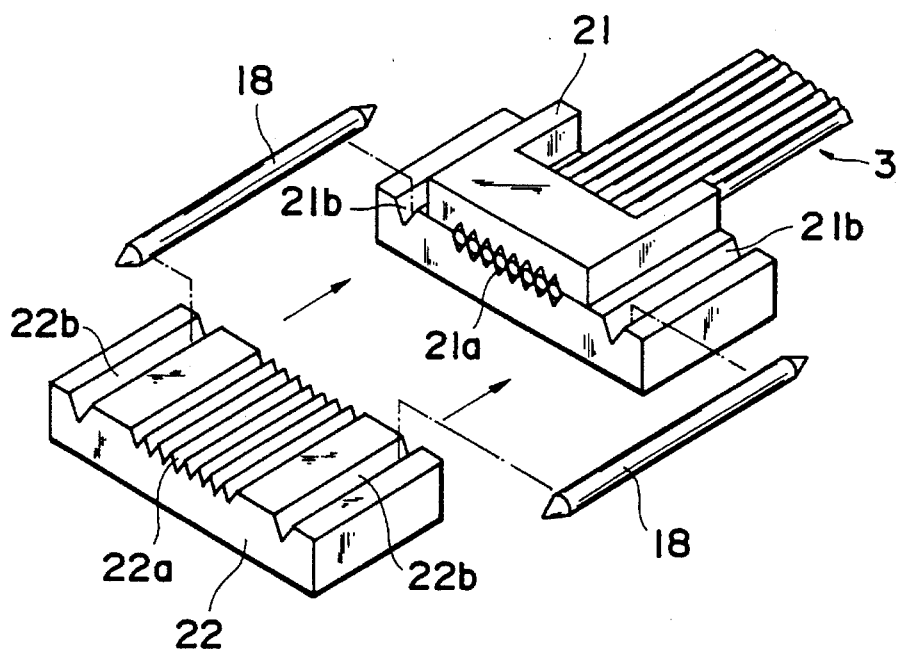
FIG. 11 is an exploded perspective view showing the relationship among the guide pins, the stationary stage, and the coupling stage of the optical switch according to the second aspect of the present invention.
Figure 12:
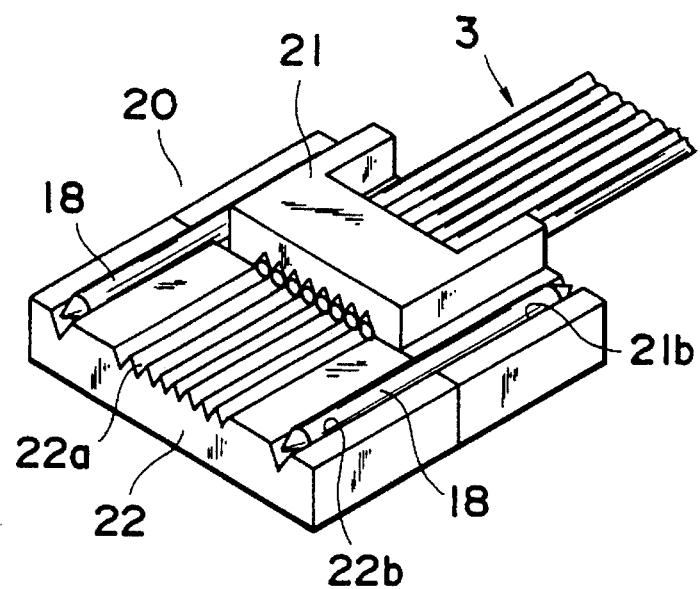
FIG. 12 is a perspective view showing the relationship among the guide pins, the stationary stage, and the coupling stage of the optical switch according to the second aspect of the present invention.

As shown in FIGS. 9 and 10, the displacement stage 5 is formed of a non-permeable material as a substantially rectangular armature. A plurality of mount grooves 5a are formed in the central portion of the inclined upper surface of the displacement stage 5 to have a V shape. The displacement stage 5 is housed and arranged at the left side in the case 1A such that it is displaceable in the horizontally lateral direction, in other words, in an aligning direction of the plurality of second optical fibers 3.

The plurality of mount grooves 5a extend in the oblique left-to-right direction in FIG. 9 and mount the plurality of master ferrules 4 therein in an inclinedly fixed state. As the plurality master ferrules 4 are mounted in the mount grooves 5a, the free end portions of the plurality of first optical fibers 2 which have moved downward are located at a lower position.

Figure 21:
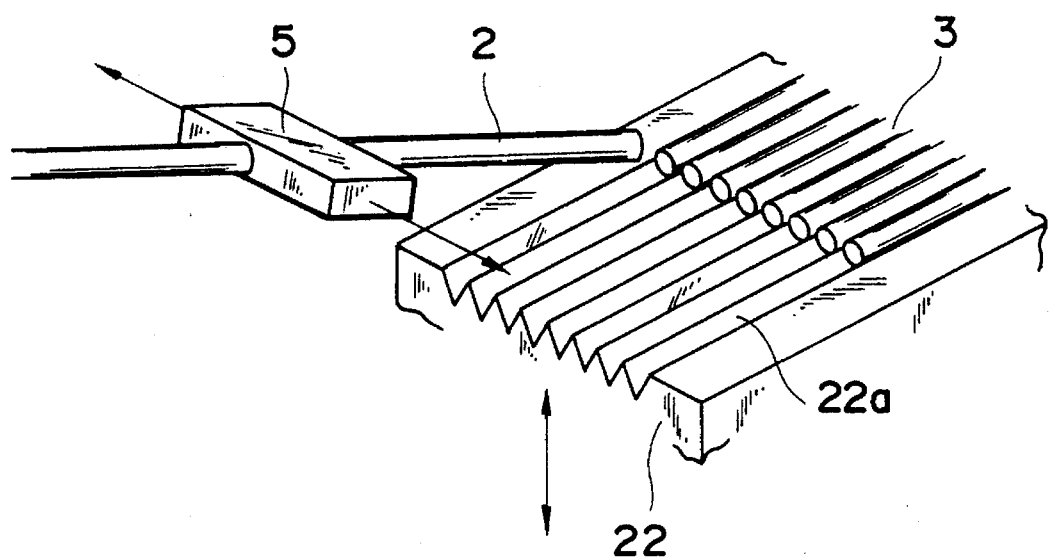
FIG. 21 is a perspective view showing the current OFF state of the optical switch according to the second aspect of the present invention.
Figure 22:
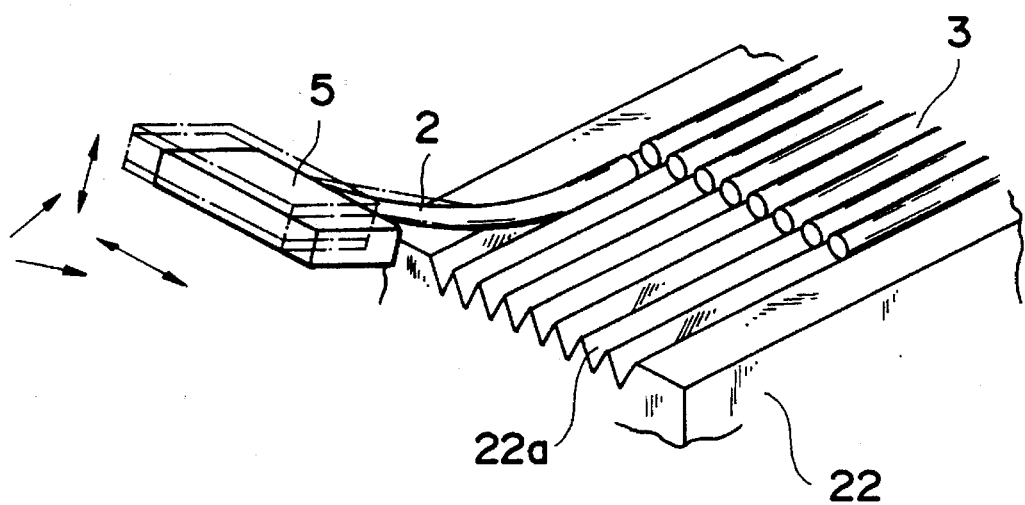
FIG. 22 is a perspective view showing the current ON state of the optical switch according to the second aspect of the present invention.

The plurality of first optical fibers 2 are mounted such that their free end portions are fitted in V-shaped grooves 22a of a coupling stage 22 in a flexed state when the elevating stage 20 is moved upward (when the optical paths of the optical fibers are to be switched), as shown in FIGS. 21 and 22.

As shown in FIGS. 9 and 10, a VCM coil (voice coil) 6A wound in a substantially O-shaped manner is mounted to the rear surface portion of the displacement stage 5. The two end portions of the VCM coil 6A are connected (not shown) to a coil end terminal 27. A pair of VCM permanent magnets 7A oppose the VCM coil 6A through a small gap.

As shown in FIGS. 9 and 10, the pair of VCM permanent magnets 7A are aligned at the left side in the case 1A in a lateral line. The N and S poles at the front surfaces of the VCM permanent magnets 7A oppose the VCM coil 6A. The rear surface portions of the VCM permanent magnets 7A overlap a yoke (iron core) 8 forming a magnetic path.

As shown in FIG. 9, the yoke 8 is arranged at the left side in the case 1A and constitutes the coil motor 9 serving as the first driving means together with the displacement stage 5 serving as the armature, the VCM coil 6A, and the pair of VCM permanent magnets 7A.

The coil motor 9 is driven upon reception of power and displaces the displacement stage 5 mounting the plurality of first optical fibers 2 thereon in the horizontally lateral direction, in other words, in the aligning direction of the plurality of second optical fibers 3 (see FIG. 10).

Leaf springs 16 for regulating the range of displacement of the displacement stage 5 are mounted to the two side surface portions of the displacement stage 5. The pair of leaf springs 16 are mounted to spacers 17b at the two side surface portions of a stationary block 17 that moves close to the coil end terminal 27(See FIG. 10).

The stationary block 17 is arranged at the right side in the case 1A. Mount grooves 17a extending in the oblique direction of FIG. 9 are horizontally formed in the two sides of the upper surface of the stationary block 17. Positioning guide pins (pins) 18 extending in the same direction are horizontally mounted in the pair of mount grooves 17a in a fitted state.

Parts of the pair of guide pins 18 project from the stationary block 17 in the oblique direction of FIG. 9. As shown in FIGS. 9, 15, 16, 28, and 29, an actuator (second driving means) 19 located between the pair of leaf springs 16 is disposed between the stationary block 17 and the displacement stage 5.

As shown in FIG. 9, the elevating stage 20 is constituted by a stationary stage 21 and a coupling stage 22 to have a plate-like shape, is mounted to the distal end of the upper portion of the stationary block 17 through a support leaf spring 28 to be swingable in the vertical direction, and is arranged in a space surrounded and defined by the pair of leaf springs 16, the stationary block 17, and the displacement stage 5. When the optical paths of the optical fibers are to be switched, the elevating stage 20 is moved upward from a normal lower position as it is driven by the actuator 19.

The stationary stage 21 is constituted by a silicon wafer. A plurality of positioning V-shaped grooves 21a are formed by cutting in the surface of the stationary stage 21 in a lateral line at a pitch of 0.25 mm. Positioning grooves 21b are formed by cutting to locate at the two side portions of the stationary stage 21. The guide pins 18 are engaged with the pair of positioning grooves 21b in a fitted state.

Figure 13:
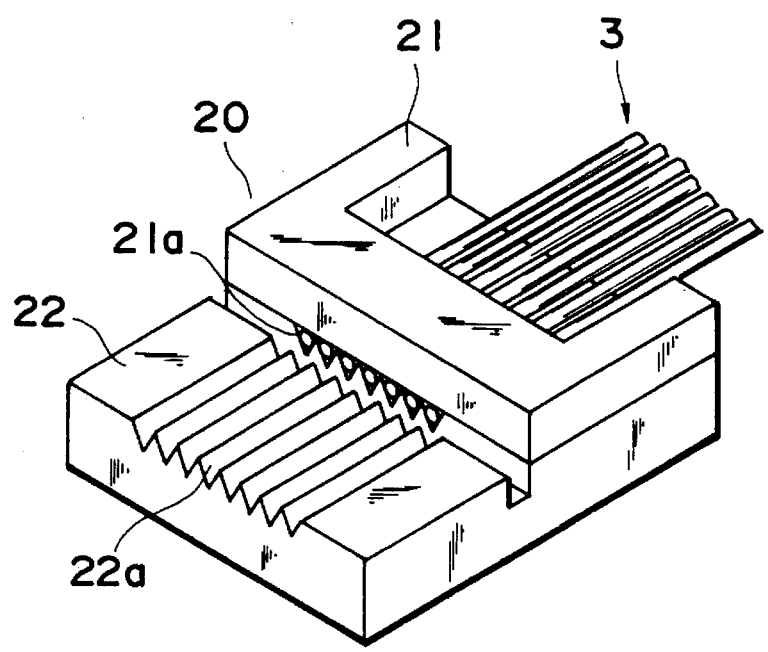
FIG. 13 is a perspective view showing the relationship among the conventional guide pins, stationary stage, and coupling stage.
Figure 14:
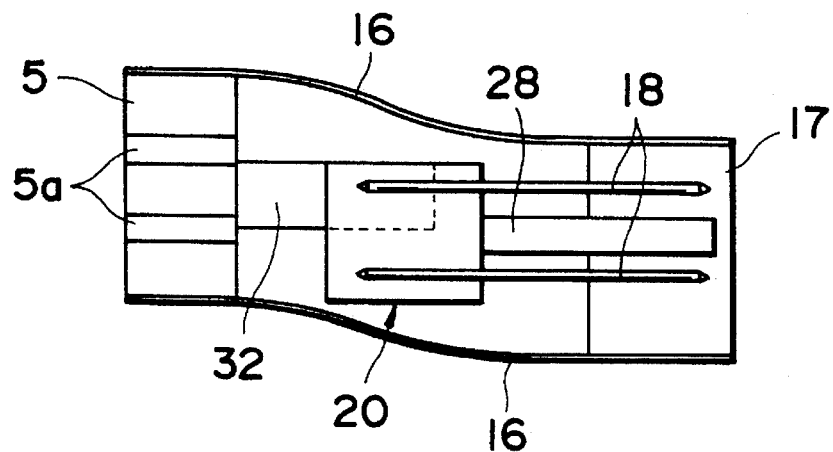
FIG. 14 is a plan view showing the main part of the embodiment of the optical switch according to the second aspect of the present invention.

Meanwhile, the coupling stage 22 is constituted by a silicon wafer to have a separation type structure (see FIGS. 11 and 12), different from the integral type coupling stage 22 shown in FIG. 13, and is adhered to the front portion of the stationary stage 21 to be the same level as that. The plurality of positioning/coupling V-shaped grooves 22a are formed in the surface of the coupling stage 22 by cutting in a lateral line at a pitch of 0.25 mm. The plurality of V-shaped grooves 22a communicate with the plurality of V-shaped grooves 21a of the stationary stage 21 to oppose them.

Figure 17:
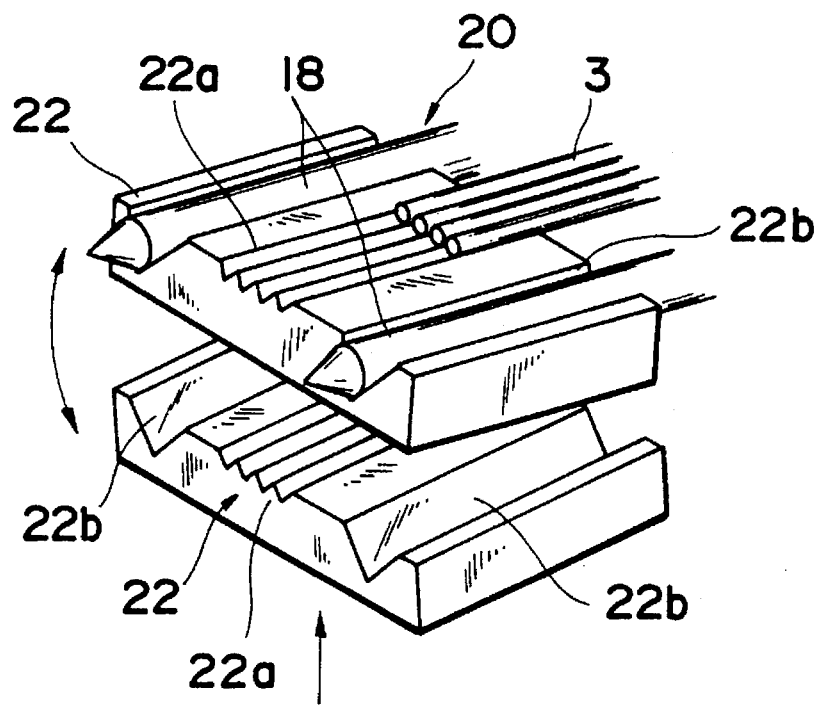
FIG. 17 is a perspective explanatory view showing the guide pins, the stationary stage, and the coupling stage of the optical switch according to the second aspect of the present invention.
Figure 18:
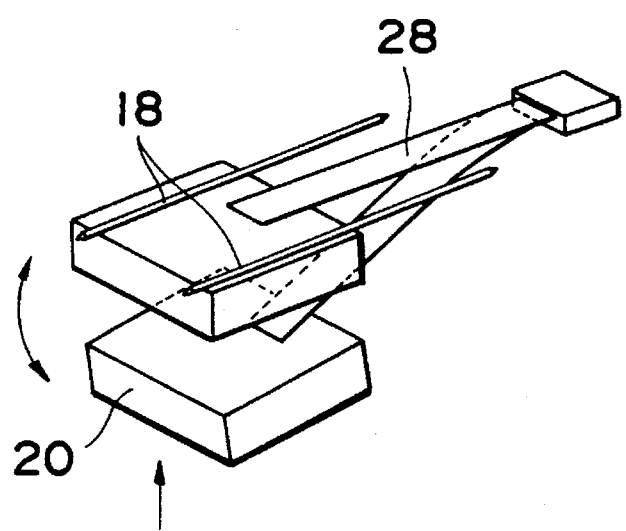
FIG. 18 is a perspective view showing the elevating stage of the optical switch according to the second aspect of the present invention.
Figure 19:
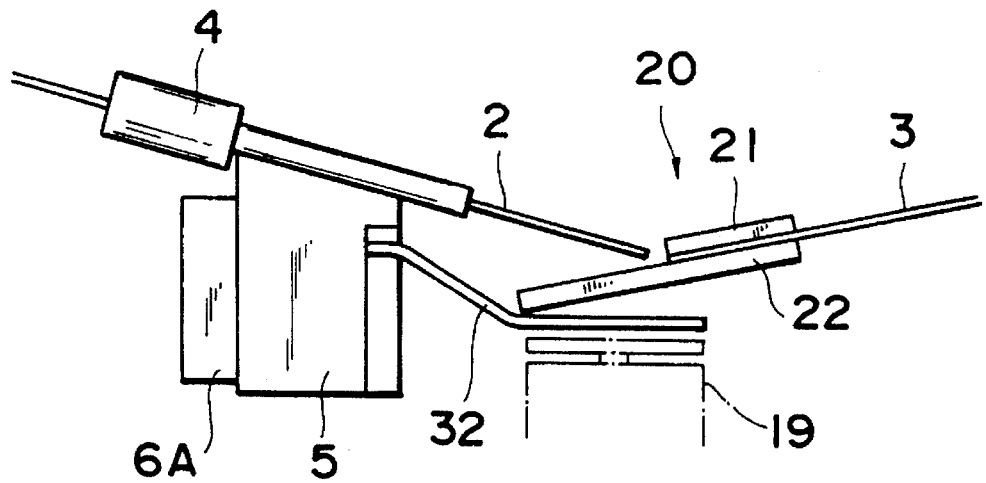
FIG. 19 is a side view showing a current OFF state of the optical switch according to the second aspect of the present invention.
Figure 20:
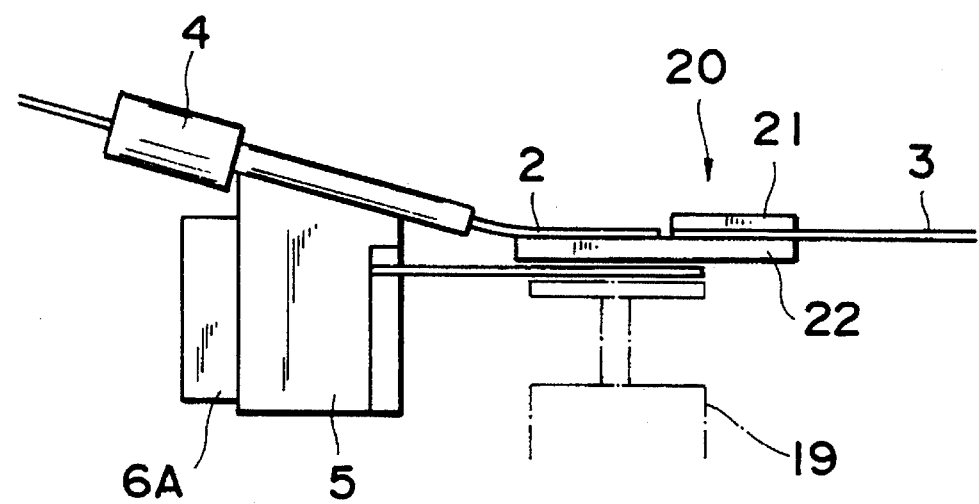
FIG. 20 is a side view showing a current ON state of the optical switch according to the second aspect of the present invention.

Positioning grooves 22b are formed in the two side portions of the surface of the coupling stage 22 by cutting, and the guide pins 18 are engaged with the pair of positioning grooves 22b in a fitted state (see FIG. 17).

When the optical paths of the optical fibers are to be switched, the coupling stage 22 causes the free end portions of the plurality of first optical fibers 2, flexed by the V-shaped grooves 22a of the coupling stage 22, to abut against the free end portions of a plurality of arbitrary second optical fibers opposite each other, and couples them.

The plurality of second optical fibers 3 having flexibility consist of eight optical fibers horizontally extending from the right to the left side of FIG. 9 and are wrapped in a belt-like cable 23 as they are aligned in a lateral line. The second optical fibers 3 are fitted in the plurality of V-shaped grooves 21a of the stationary stage 21 in a stationary state so that they are aligned.

Figure 15:
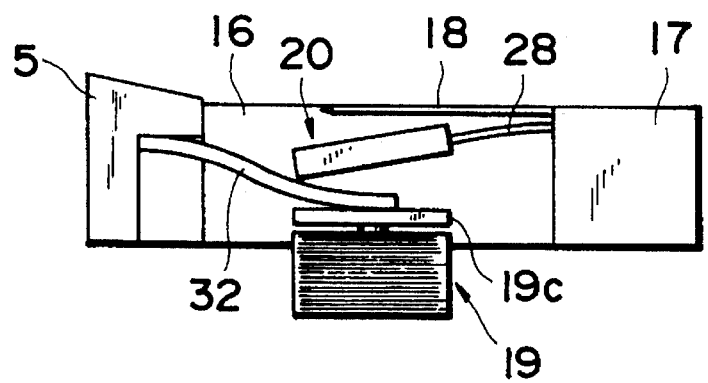
FIG. 15 is a sectional side view showing a current OFF state of the actuator of the optical switch according to the second aspect of the present invention.
Figure 16:
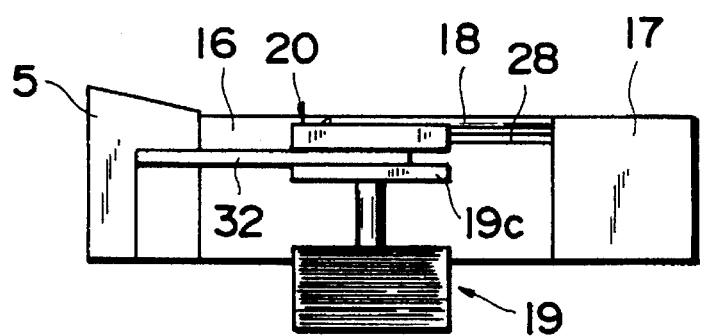
FIG. 16 is a sectional side view showing a current ON state of the actuator of the optical switch according to the second aspect of the present invention.

As shown in FIGS. 15 and 16, in the actuator 19, a coil 19a that generates a repulsive force upon reception of power is arranged in a space surrounded and defined by the pair of leaf springs 16, the stationary block 17, and the displacement stage 5. The two end portions of the coil 19a are connected (not shown) to the coil end terminal 27.

A permanent magnet rod 19b having a permanent magnet is inserted in the vertical hole at the central portion of the coil 19a to be vertically movable. A permanent magnet portion 19c at the top of the permanent magnet rod 19b abuts against the lower surface of the inclined elevating stage 20 to push the elevating stage 20 upward in the horizontal state.

When the optical paths of the optical fibers are not to be switched, the actuator 19 moves the elevating stage 20 downward in the inclined state to separate the plurality of first optical fibers 2 from the plurality of second optical fibers 3. When the optical paths of the optical fibers are to be switched, the actuator 19 moves the elevating stage 20 upward in the horizontal state to cause the plurality of first optical fibers 2 and the plurality of second optical fibers 3 to oppose each other, and mounts and supports the free end portions of the plurality of first optical fibers 2 in the V-shaped grooves 22a of the coupling stage 22 in a flexed state (see FIGS. 19 and 20).

The displacement amount of the displacement stage 5 is not controlled by the linear encoder 14, unlike in the first aspect of the present invention described above, but is controlled based on the balance of a restoration force generated proportionally to the displacement amount and the force generated by the coil motor 9. Thus, the glass scale 10, the light-shielding plate 12, the origin sensor 13, and the linear encoder 14 can be omitted.

Figure 23:
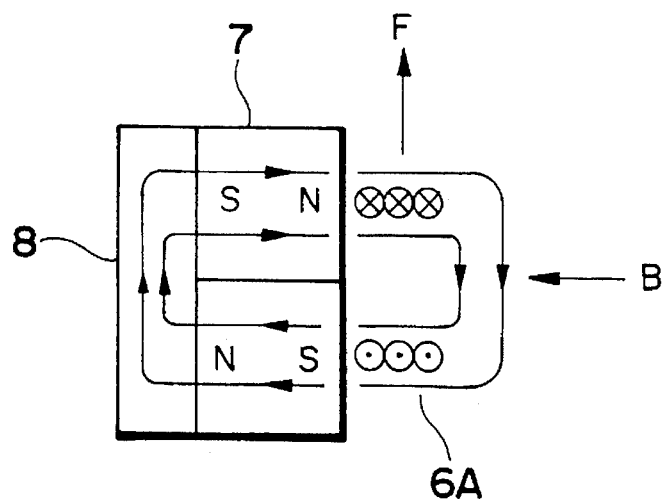
FIG. 23 is an explanatory view showing the control principle of the displacement amount of the displacement stage of the optical switch according to the second aspect of the present invention.

This will be described in detail. To displace the displacement stage 5, the coil motor 9 is caused to generate a force based on the Fleming's left-hand rule, as shown in FIG. 23. This force is utilized as the driving force.

Referring to FIG. 23, a driving force F of the coil motor 9 for displacing the displacement stage 5 is expressed by the following equation:

$$F = i \times B \times l \cdot N$$

where i: current

B: magnetic flux density l: effective length of the VCM coil 6A

N: number of turns of the VCM coil 6A

Theoretical calculation and a control method of the driving force of the coil motor 9 will be described.

A displacement amount X of the displacement stage 5 is expressed by the following equation:

X (displacement amount of the displacement stage 5)

[mm]=R·i (current supplied to the coil motor 9) [mA]

where R is expressed by the following equation:

[Equation 3]
$$R = \frac{L^3}{12EI} \cdot \frac{NBl}{9.8} \cdot \frac{1}{1000} \qquad (3)$$

I is expressed by the following equation:

[Equation 4]
$$I = \frac{bt^3}{12} \qquad (4)$$

where

L: length [mm] of the leaf springs 16 b: width [mm] of the leaf springs 16 t: thickness [mm] of the leaf springs 16

E: longitudinal elastic coefficient [kg weight/mm²] of the leaf springs 16

I: secondary moment of the cross section of the leaf springs 16

Figure 24:
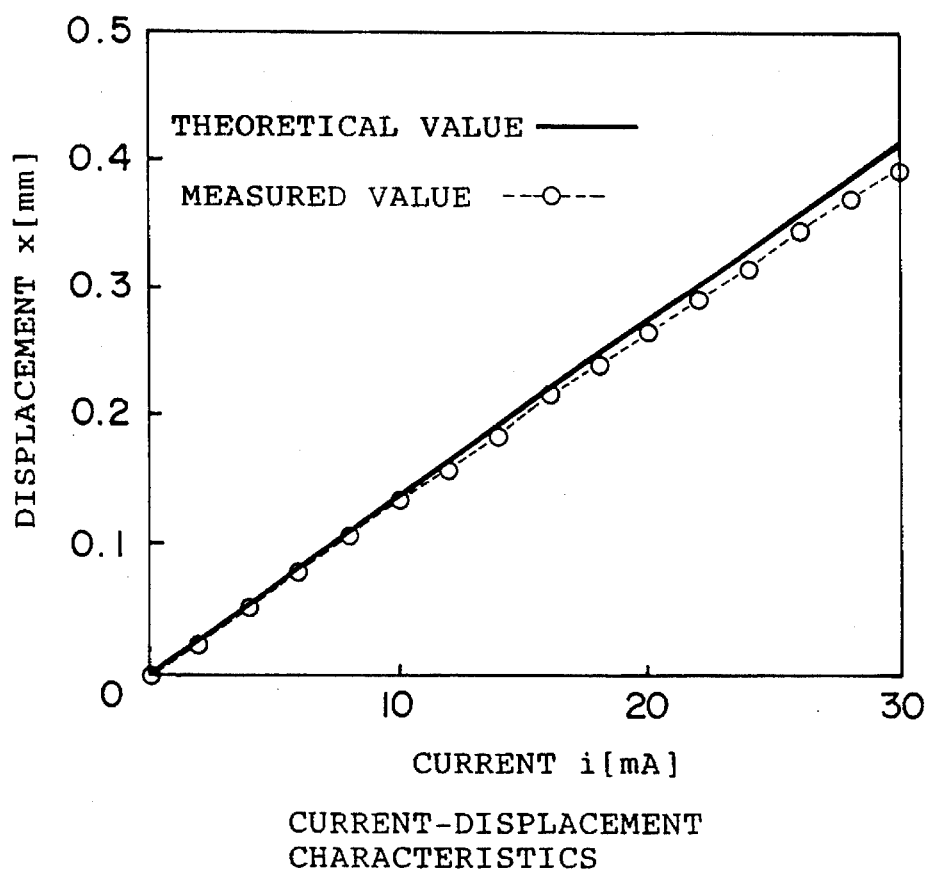
FIG. 24 is a graph showing the current-displacement characteristics of the displacement stage of the optical switch according to the second aspect of the present invention.

FIG. 24 shows a graph representing theoretical values, based on the above theoretical calculation and control method, and experimental values. It is known from FIG. 24 that a good coincidence is established between the theoretical values and the experimental values.

The proportional constant R is characterized in that its temperature dependency is very small. The reason for this will be described with reference to FIG. 25.

Figures 25, 26, 27:
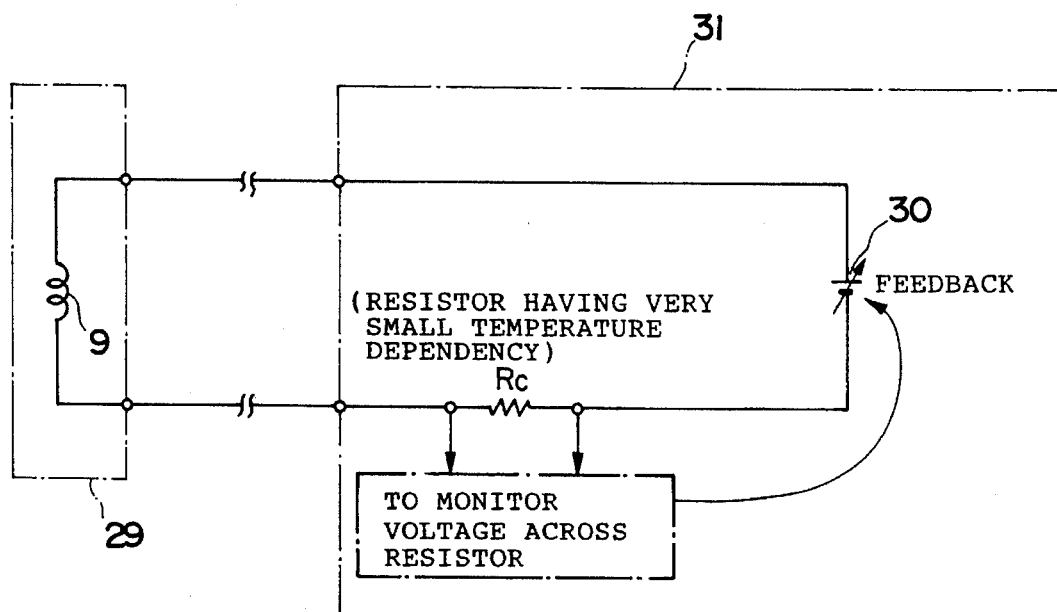
FIG. 25 shows an equation concerning the displacement stage of the optical switch according to the second aspect of the present invention.
FIG. 26 is a view for explaining an equation concerning the displacement stage of the optical switch according to the second aspect of the present invention.
FIG. 27 is a system diagram showing a control example concerning the displacement stage of the optical switch according to the second aspect of the present invention.
Figure 28:
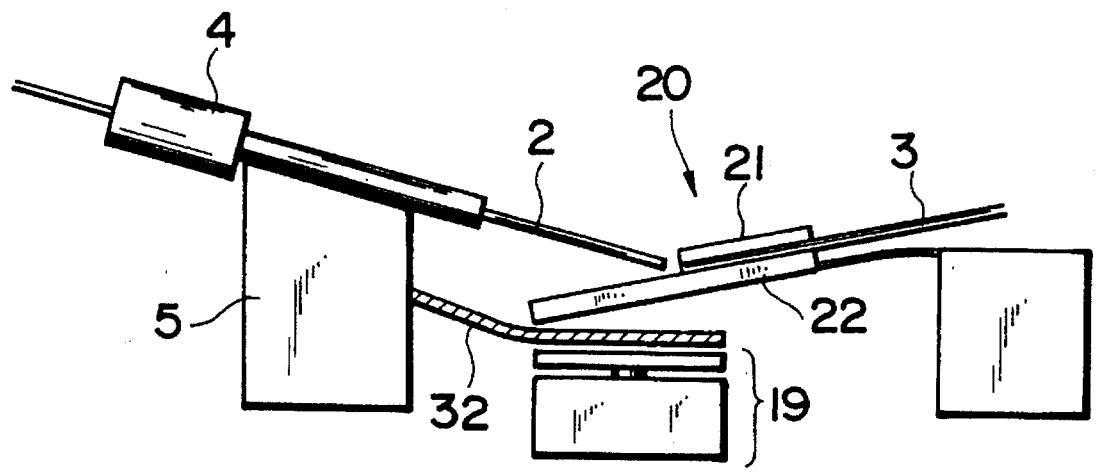
FIG. 28 is a side view showing an elastic body in the current OFF state of the optical switch according to the second aspect of the present invention.
Figure 29:
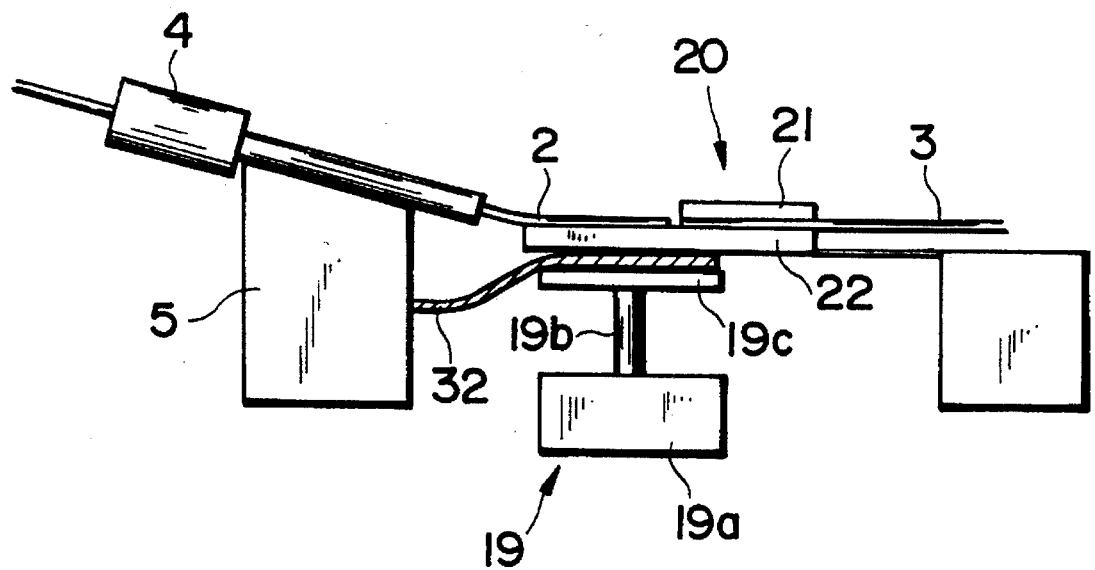
FIG. 29 is a side view showing the elastic body in the current ON state of the optical switch according to the second aspect of the present invention.

From equations (3) and (4) described above, R is expressed by the equation shown in FIG. 25. Referring to FIG. 25, factors surrounded by solid circles are increased as the temperature is increased, factors surrounded by dotted circles are decreased as the temperature is increased, and factors which are not surrounded do not change as the temperature is increased. This also applied to FIG. 26.

Therefore, the temperature dependency can be canceled by the denominator and the numerator. Especially, since the factors surrounded by the solid circles express the coefficient of linear expansion of the material, they can be completely canceled.

Hence, even when the temperature varies, if i is set constant, the displacement amount X does not vary upon a temperature change. Therefore, constant-current control is sufficient, and the glass scale 10, the light-shielding plate 12, the origin sensor 13, and the linear encoder 14 becomes unnecessary.

FIG. 27 shows a control example in which wiring and control are simplified. Referring to FIG. 27, reference numeral 29 denotes a switch; 30, a variable power supply; and 31, a controller.

As shown in FIGS. 14, 15, 16, 28, and 29, the elastic body 32 is made of a material having flexibility, e.g., rubber or plastic, to have a plate-like shape. The elastic body 32 projects from the lower surface of the displacement stage 5 opposing the elevating stage 20 to extend in an inclined state such that it flexes only in the vertical direction, and is arranged on the permanent magnet portion 19c of the actuator 19.

When the elevating stage 20 is to be moved upward, the elastic body 32 is sandwiched between the lower surface of the elevating stage 20 and the permanent magnet portion 19c, and fixes the position of the displacement stage 5 in the horizontal direction.

The operation will be described. To switch the optical paths by coupling the plurality of first optical fibers 2 and a plurality of selected arbitrary second optical fibers, first, the actuator 19 and the coil motor 9 are powered off.

Then, the permanent magnet rod 19b is moved downward to restore the elevating stage 20 to the separate position, thereby separating the plurality of second optical fibers 3 from the plurality of first optical fibers 2, so they will not contact each other. The displacement stage 5 which has been displaced in the horizontally lateral direction is restored to the normal position (the position shown in FIG. 9) by the restoring function of the pair of flexed leaf springs 16.

At this time, as power supply is turned off, the coil motor 9 is set free. Since the plurality of first optical fibers 2 and the plurality of second optical fibers 3 are separate from each other, damage caused by contact by the plurality of first optical fibers 2 can be prevented.

When the displacement stage 5 is restored to the normal position in this manner, power is supplied to the coil motor 9 to perform driving. Then, the displacement stage 5 is displaced from the normal position to a predetermined position while flexing the pair of leaf springs 16, and the plurality of first optical fibers 2 are located immediately above the arbitrary second optical fibers.

At this time, the displacement amount of the displacement stage 5 is controlled based on the balance of the restoration force generated proportionally to the displacement amount and the driving force generated by the coil motor 9, such that the plurality of first optical fibers 2 are located within the range of ±20 μm of the target position. Accordingly, the glass scale 10, the light-shielding plate 12, the origin sensor 13, and the linear encoder 14 can be omitted.

When the plurality of first optical fibers 2 are located within the range of ±20 μm of the target position in this manner, power is supplied to the actuator 19. Then, the permanent magnet rod 19b is moved upward to move the inclined elevating stage 20 upward to the contact position through the elastic body 32 sandwiched between them. The elastic body 32 fixes the position of the displacement stage 5 in the horizontal direction as it is sandwiched between the lower surface of the elevating stage 20 and the permanent magnet portion 19c. The guide pins 18 are engaged with the pair of positioning grooves 21b of the elevating stage 20 in the fitted state, so that the guide pins 18 are positioned.

The plurality of first optical fibers 2 and the plurality of arbitrary second optical fibers oppose each other at a position where they can contact each other. Simultaneously, the free end portions of the plurality of first optical fibers 2 are mounted and supported in the V-shaped grooves 22a of the coupling stage 22 in the flexed fitting state so that the plurality of first optical fibers 2 and the plurality of arbitrary second optical fibers are coupled in the V-shaped grooves 22a, thereby switching the optical paths of the optical fibers.

With the above arrangement, since the displacement amount of the displacement stage 5 is controlled based on the balance of the restoration force generated proportionally to the displacement amount and the driving force generated by the coil motor 9, the same effect as that of the first aspect of the present invention can be obtained. Also, the glass scale 10, the light-shielding plate 12, the origin sensor 13, and the linear encoder 14 can be omitted.

When the optical paths of the optical fibers are to be switched, the elastic body 32 is sandwiched between the lower surface of the elevating stage 20 and the permanent magnet portion 19c with the frictional force and fixes the position of the displacement stage 5 in the horizontal direction (nonvolatile function). Therefore, even if the coil motor 9 is in the free state, a positional error of the optical fibers can be reliably prevented, and an increase in size can be avoided.

Since the stationary and coupling stages 21 and 22 of the elevating stage 20 form a separation type structure, end face polishing of the optical connectors is enabled to obtain the same reflection amount (with a reflection attenuation amount of 40 dB or more) as that of a detachable connector type optical switch. Then, the problem of poor reflection characteristics (with a reflection attenuation amount of about 35 dB) which is caused since the end faces of the optical connectors cannot be polished can be solved, and prevention of an increase in size can be expected.

Furthermore, the support leaf spring 28 that displaces to always form the same track is mounted to the distal end of the upper portion of the stationary block 17, and the elevating stage 20 is mounted to the distal end portion of the support leaf spring 28 to be vertically swingable. Therefore, reliable prevention of a positional error of the optical fibers in the axial direction and orthogonal directions can be expected.

The third aspect of the present invention will be described in detail by way of an embodiment shown in FIG. 30.

An optical switch according to the third aspect of the present invention has a first displacement stage 5A mounting a first optical fiber 2 thereon, a second displacement stage 5 for supporting the first displacement stage 5A, a non-elevating stage 20A mounting a plurality of second optical fibers 3, a coil motor 9 for displacing the displacement stage 5, and an actuator 19 for moving the first displacement stage 5A downward. The positioning body of the non-elevating stage 20A is sandwiched by the first displacement stage 5A and the actuator 19, thereby fixing the position of the second displacement stage 5.

Figure 30:
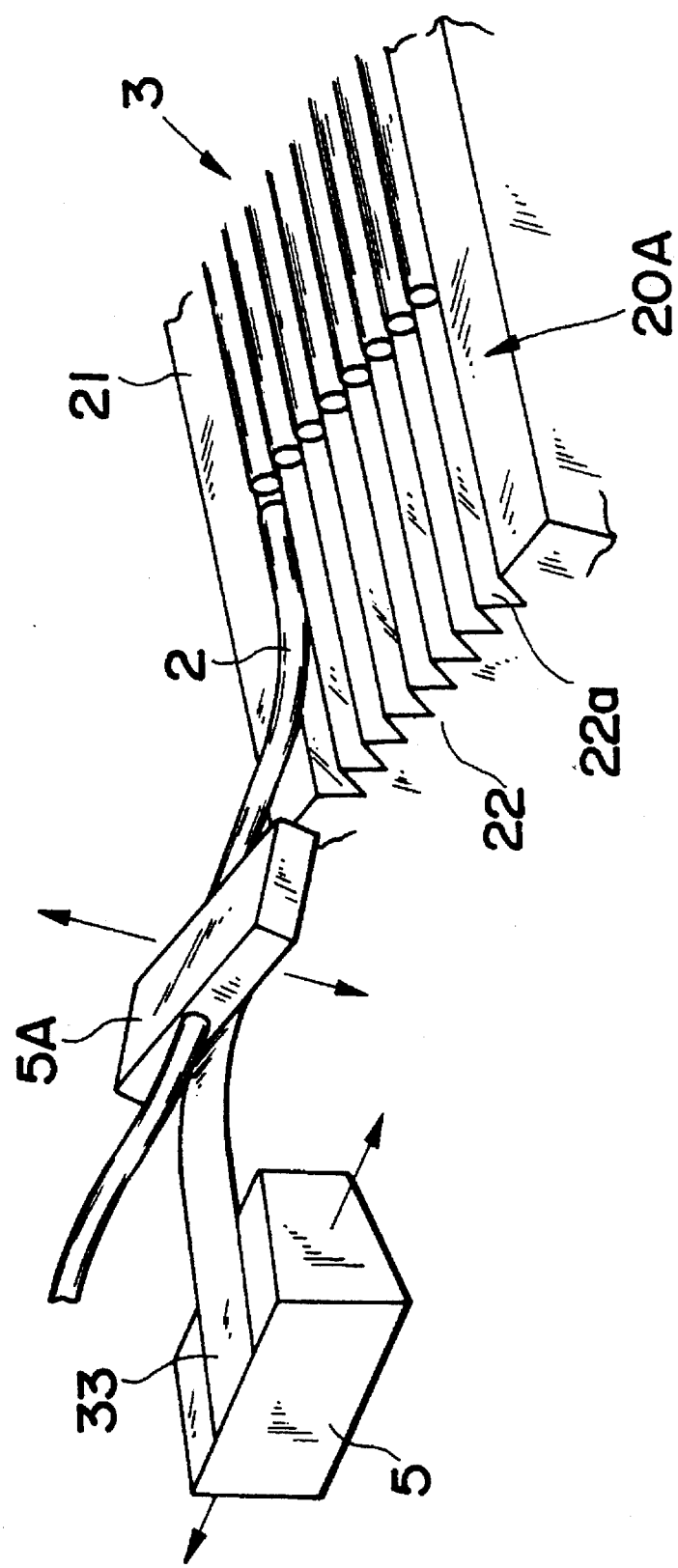
FIG. 30 is a perspective view showing the main part of an embodiment of an optical switch according to the third aspect of the present invention.

As shown in FIG. 30, the first displacement stage 5A has a rectangular shape and is mounted to the distal end portion of a mount leaf spring 33 which is flexible only in the vertical direction. The lower end portion of the mount leaf spring 33 is connected to the upper portion of the second displacement stage 5 having almost the same structure and function as those of the second displacement stage 5, thereby supporting the single first optical fiber 2.

The actuator 19 (not shown) is provided below the first displacement stage 5A. When the actuator 19 is operated in switching the optical path of the optical fiber, the first displacement stage 5A is moved downward and displaced from an upper position to a lower position, and the free end portion of the first optical fiber 2 is mounted on and supported in a V-shaped groove 22a of a coupling stage 22 as it is flexed and fitted in it. Thus, the first optical fiber 2 and the arbitrary second optical fiber oppose each other at a position where they can contact each other.

The non-elevating stage 20A has substantially the same arrangement as that of the elevating stage 20 and mounts the plurality of second optical fibers 3 that are aligned in a lateral line. Unlike the elevating stage 20, the non-elevating stage 20A does not have an elevating function.

The non-elevating stage 20A is integrally provided with a positioning body (not shown) which has substantially the same function as that of the elastic body 32. As the positioning body is sandwiched by the first displacement stage 5A and a permanent magnet portion 19c of the actuator 19, the position of the second displacement stage 5 in the horizontal direction is fixed. Regarding other portions, they are the same as those of the first and second aspects of the present invention described above.

It is apparent that the same function and effect as those of the first and second inventions of the present invention described above can be expected in the third aspect of the present invention.

Figure 31:
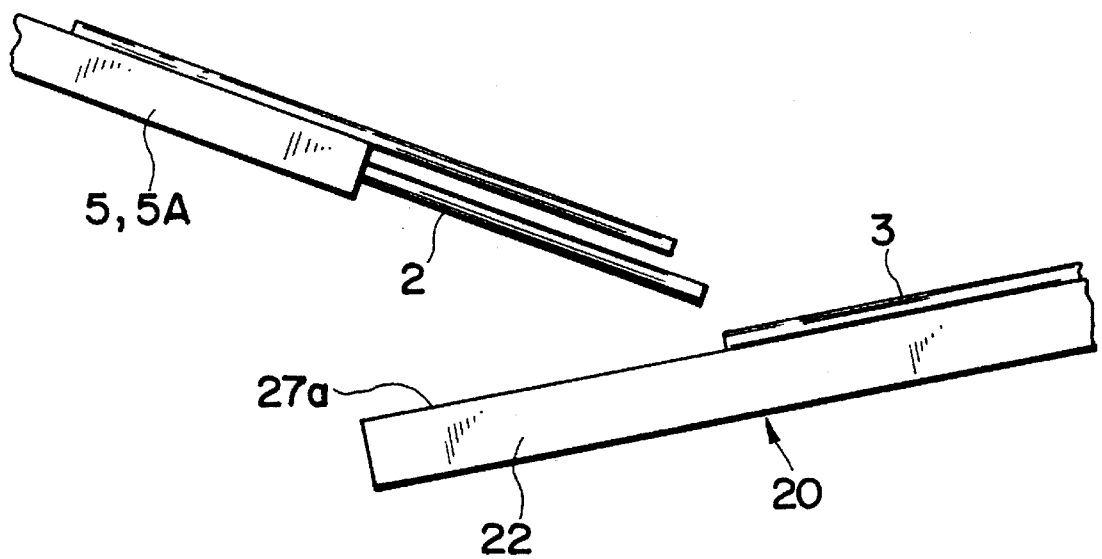
FIG. 31 is an explanatory side view showing the press leaf spring of the optical switch according to the present invention.
Figure 32:
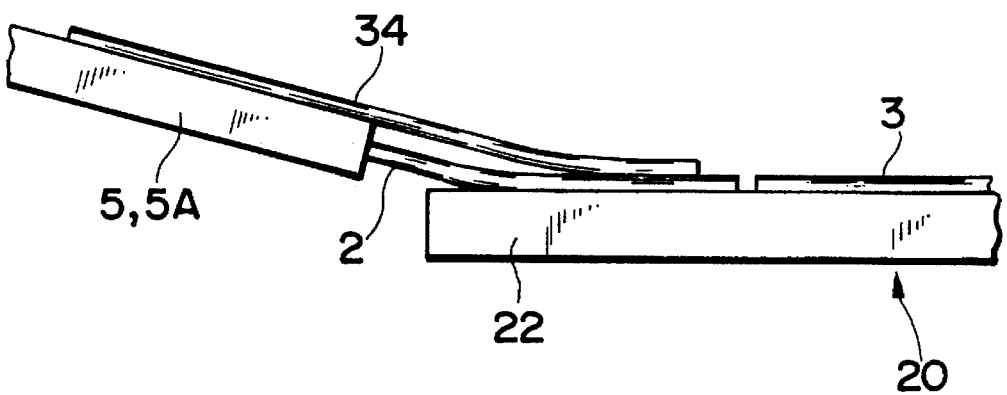
FIG. 32 is an explanatory side view showing the flexed press leaf spring of the optical switch according to the present invention.

In the description of the first and second aspects of the present invention, when the optical path(s) of the optical fiber(s) is (are) to be switched, the free end portion(s) of the first optical fiber(s) 2 is (are) mounted in and supported by the V-shaped groove(s) 22a of the coupling stage 22 as it is (they are) flexed and fitted in it (them). However, as shown in FIGS. 31 and 32, a press leaf spring (press body) 34, that flexes upon switching the optical paths and urges the end portions of flexed first optical fibers 2 against V-shaped grooves 22a in the surface of a coupling stage 22, may be mounted to the upper surface portion of a displacement stage 5 or a first displacement stage 5A.

In this manner, a defect in which the first optical fibers 2 are caught by the inclined surfaces of the V-shaped grooves 22a to cause axial misalignment during repeated switching operations, thereby abruptly increasing a loss, can be eliminated with a simple arrangement.

Figure 33:
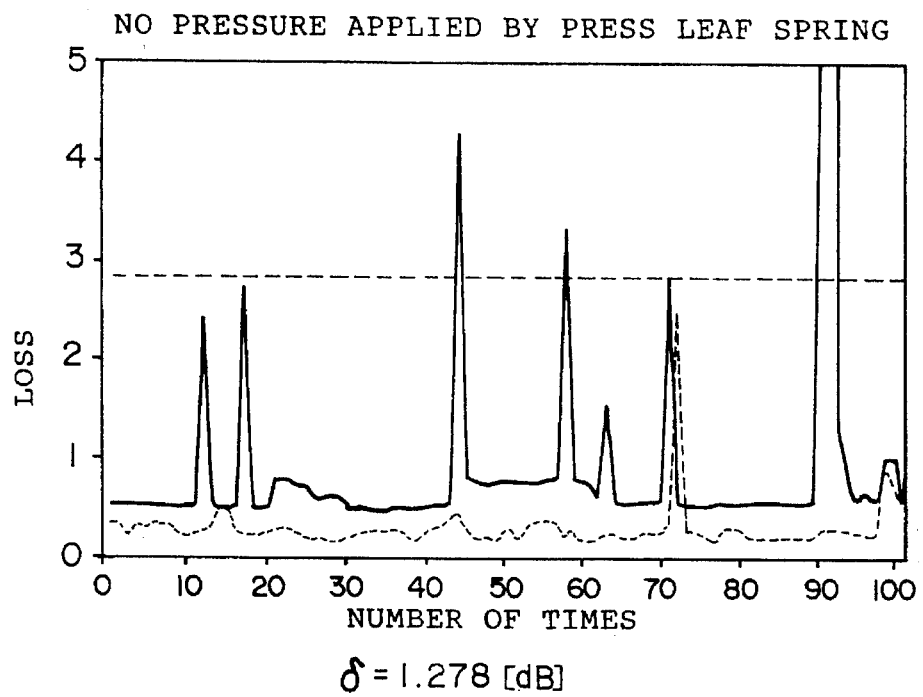
FIG. 33 is a graph showing the loss characteristics of an optical fiber of a case in which a press leaf spring is not used.
Figure 34:
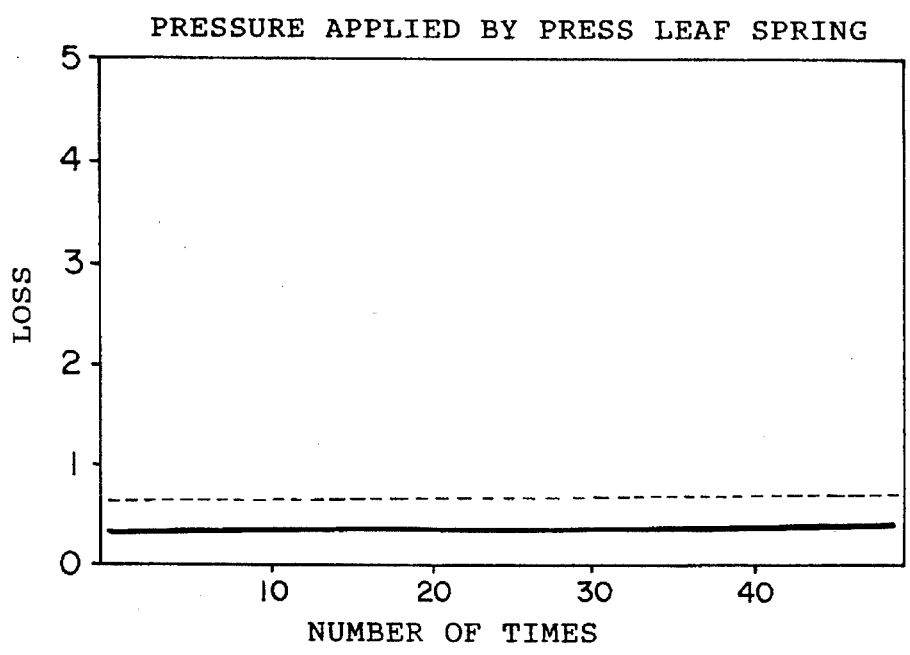
FIG. 34 is a graph showing the loss characteristics of an optical switch of a case in which a press leaf spring is used.

FIGS. 33 and 34 show graphs showing cases wherein a press leaf spring 34 is used and not used, respectively. It is apparent from the comparison and study of these two graphs that the defect of abrupt increase in loss can be eliminated by using the press leaf spring 34.

In the above embodiments, the press leaf spring 34 is constituted by a leaf spring. However, the present invention is not limited to this as far as the spring has the same function as this, as a matter of course.

Figure 35:
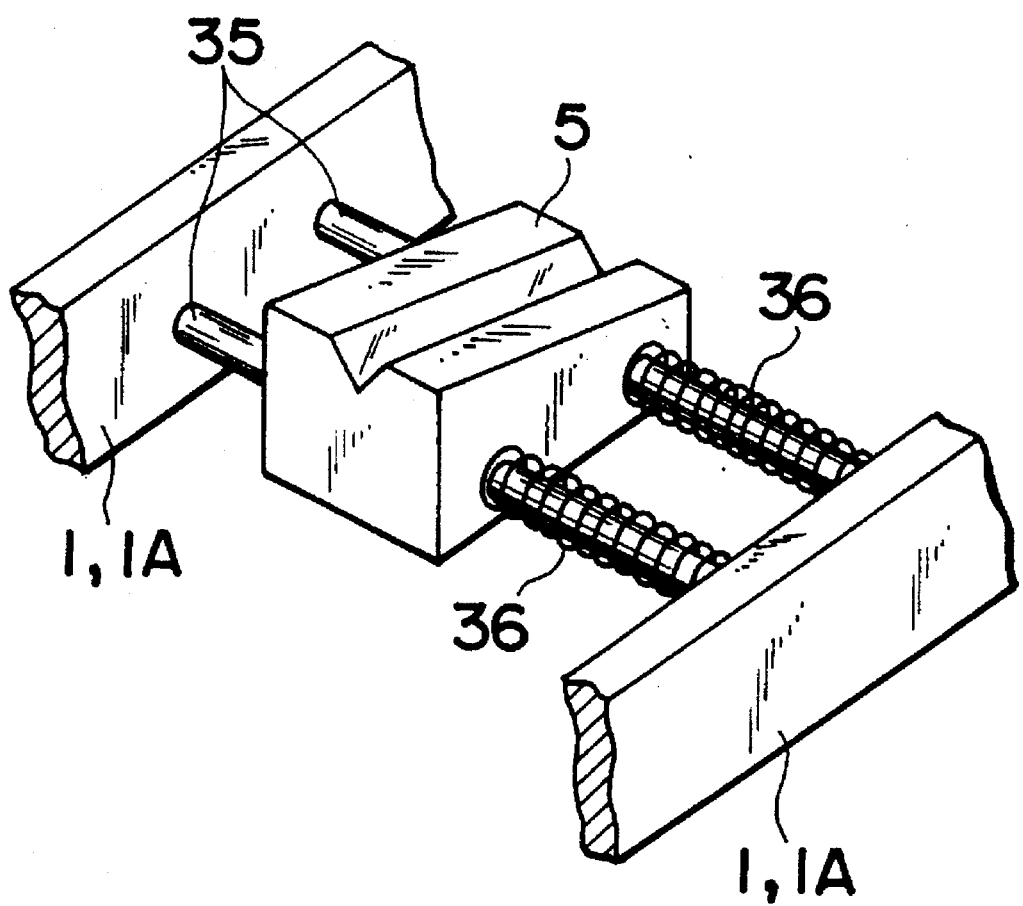
FIG. 35 s a perspective view showing the main part of still another embodiment of the optical switch according to the present invention.

In the above embodiments, the displacement stage 5 or the second displacement stage 5 is supported by the pair of leaf springs 16. However, as shown in FIG. 35, the same function and effect as those of the above embodiments can be obtained by horizontally providing two guide shafts 35 to extend between the two side walls of a case 1 or a case 1A in order to guide the displacement stage 5 or the second displacement stage 5, and inserting coil springs 36, that elastically bias the displacement stage 5 or the second displacement stage 5 in one direction, in the two guide shafts 35.

The above embodiments show a 2×8 optical switch and a 1×8 optical switch. However, the number of first optical fibers 2 can be increased to m, and the number of the plurality of second optical fibers 3 can be increased to m×n, thereby constituting an m-core package type optical switch.

A refractive index matching agent, e.g., silicone oil, that matches the cores of the optical fibers may be filled in the case 1 or the case 1A of the m-core package type optical switch, thereby providing the same function and effect as those of the above embodiments.

As has been described above, according to the first aspect of the present invention, since a selecting connector and a selected connector are not utilized, any large fitting force need not be effected for fitting the connectors. Therefore, the necessity of forming the box of the switch from a strong material to ensure a large rigidity so that the box can endure the fitting force can be eliminated, which is a remarkable effect.

Furthermore, the weight of the displacement stage can be decreased. Also, a decrease in driving force, in other words, a decrease in power consumption and size can be expected, thus providing an excellent effect.

Since the first optical fiber and an arbitrary second optical fiber are connected in a V-shaped groove, positioning precision can be coarse, and the necessity of providing an expensive, high-grade positioning mechanism to the actuator can be eliminated, thus providing a large effect.

Since the stationary stage and the coupling stage of the elevating stage are integrally formed, size reduction can be achieved, and a remarkable effect of eliminating the necessity of aligning the V-shaped groove with the connector can be expected.

Since the optical switch can be easily assembled, the assembly operability of the apparatus can be improved. Furthermore, even when positional variation occurs due to vibration and the like, if the positional variation is within the allowable range of the V-shaped groove, variations in optical intensity can be suppressed, thus providing a remarkable effect.

Positioning precision of the second driving means can be coarse, and the optical switch can be directly applied to a multi-core structure having three or more cores without changing the structure, thus providing an excellent effect.

Since this optical switch is of a mechanical type, problems, e.g., a large loss, large crosstalk, and large polarization dependency and wavelength dependency that cannot be neglected in terms of reliability can be solved, thus providing a large effect.

According to the second aspect of the present invention, since the displacement amount of the displacement stage is controlled based on the balance of the restoration force generated proportionally to the displacement amount and the force generated by the first driving means, the glass scale, the light-shielding plate, the origin sensor, and the linear encoder can be omitted, thus providing a remarkable effect.

Since the elastic body is sandwiched between the elevating stage and the second driving means to fix the position of the displacement stage, even if the first driving means is in a free state, positional errors of the optical fibers can be reliably prevented, and an increase in size can be prevented, thus providing a remarkable effect.

Since the stationary stage and the coupling stage of the elevating stage form a separation type structure, end face polishing of the optical connectors is enabled to obtain the same reflection amount as that of a detachable-connector optical switch. Then, the problem of poor reflection characteristics, which is caused since the end faces of the optical connectors cannot be polished, can be solved, and prevention of an increase in size can be expected.

According to the present invention, since a press body for pressing the end portion of the flexed first optical fiber against the V-shaped groove in the surface of the coupling stage is mounted to the first displacement stage, a defect in which the first optical fiber is caught by the inclined surface of the V-shaped groove to cause axial misalignment during repeated switching operations, thereby abruptly increasing loss, can be eliminated with a simple arrangement, thus providing a large effect.

Since the refractive index matching agent for matching the cores at the coupling surfaces of the first optical fiber and an arbitrary second optical fiber is filled in the case, a loss at the coupling surfaces of the first optical fiber and the arbitrary second optical fiber can be prevented, thus providing a remarkable effect.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical switch comprising:

a first stage for mounting a first optical fiber thereon;

a second stage for mounting thereon a plurality of second optical fibers opposing the first optical fiber by V-shaped grooves in an aligned state;

a first driving mechanism for displacing said first stage in an aligning direction of the plurality of second optical fibers during optical path switching;

a controller for detecting a displacement amount of said first stage and controlling said first driving mechanism; and a second driving mechanism for moving said second stage upward during optical path switching to selectively couple said first optical fiber with an arbitrary second optical fiber among the plurality of second optical fibers in a V shaped groove, thereby switching an optical path of an optical fiber;

wherein said second stage includes a stationary stage portion for mounting the plurality of second optical fibers thereon to be aligned in a line in a fixed state, a coupling stage portion for coupling an end portion of the of the first optical fiber which is flexed with an end portion of the arbitrary second optical fiber in the V-shaped groove in a surface thereof, and a plurality of pins for connecting said stationary stage portion and said coupling stage portion.

2. An optical switch comprising:

a first stage for mounting a first optical fiber thereon;

a second stage for mounting thereon a plurality of second optical fibers opposing the first optical fiber by V-shaped grooves in an aligned state;

a first driving mechanism for displacing said first stage in an aligning direction of the plurality of second optical fibers during optical path switching; and a second driving mechanism for moving said second stage upward during optical path switching to selectively couple said first optical fiber with an arbitrary second optical fiber among the plurality of second optical fibers in a V shaped groove, thereby switching an optical path of an optical fiber;

wherein a displacement amount of said first stage is controlled based on a balance of a restoration force generated proportional to the displacement and a force generated by said first driving mechanism;

wherein said first stage is provided with an elastic body, sandwiched between said second stage and said second driving mechanism during optical path switching, for fixing a position of said first stage; and wherein said second stage includes a stationary stage portion for mounting the plurality of second optical fibers thereon to be aligned in a line in a fixed state, a coupling stage portion for coupling an end portion of the of the first optical fiber which is flexed with an end portion of the arbitrary second optical fiber in the V-shaped groove in a surface thereof, and a plurality of pins for connecting said stationary stage portion and said coupling stage portion.

3. An optical switch according to claim 2, characterized in that said first stage is provided with a press body for pressing an end portion of the first optical fiber which is flexed against the V shaped groove in the surface of said coupling stage portion during optical path switching.

4. An optical switch according to claim 1, characterized in that said first stage is provided with a press body for pressing an end portion of the first optical fiber which is flexed against the V shaped groove in the surface of said coupling stage portion during optical path switching.

5. An optical switch comprising:

a first stage for mounting a first optical fiber thereon;

a second stage for supporting said first stage to be vertically movable;

a third stage for mounting a plurality of second optical fibers opposing the first optical fiber thereon by V shaped grooves thereon in an aligned state;

a first driving mechanism for displacing said second stage in an aligning direction of the plurality of second optical fibers during optical path switching;

a second driving mechanism for moving said first stage downward during optical path switching to selectively couple the first optical fiber with an arbitrary second optical fiber among the plurality of second optical fibers in a V shaped groove, thereby switching an optical path of an optical fiber; and a positioning body, provided to said third stage and sandwiched between said first stage and said second driving mechanism during optical path switching, for fixing a position of said second stage;

wherein said third stage is constituted by a stationary stage portion for mounting the plurality of second optical fibers thereon to be aligned in a line in a fixed state, a coupling portion of the first optical fiber which is flexed with an end portion of the arbitrary second optical fiber in the V shaped groove in a surface thereof, and a plurality of pins for connecting said stationary stage portion and said coupling portion.

6. An optical switch according to claim 5, characterized in that said first stage is provided with a press body for pressing the first optical fiber against the V shaped groove in the surface of said coupling stage portion during optical path switching.

7. An optical switch according to claim 5, characterized in that said first stage is provided with a press body for pressing the first optical fiber against the V shaped groove in the surface of said coupling stage portion during optical path switching.

8. An optical switch according to claim 7, characterized in that the first optical fiber comprises m optical fibers, and the plurality of second optical fibers comprise m×n optical fibers, thereby constituting an m-core package type optical switch.

9. An optical switch characterized in that said optical switch according to claim 7 is housed in a case, and a refractive index matching agent for a core of the first optical fiber and cores of the plurality of second optical fibers is filled in said case.

10. An optical switch comprising:

a first member holding a first optical fiber;

a second member holding a plurality of second optical fibers opposing the first optical fiber by V shaped grooves in an aligned state;

a first driving mechanism for displacing said first member at least in an aligning direction of the plurality of second optical fibers;

a second driving mechanism for displacing said second member in a direction substantially perpendicular to the aligning direction of the plurality of second optical fibers;

a controller for coupling the first optical fiber with an arbitrary second optical fiber by driving second driving mechanism and driving said first driving mechanism after detecting a displacement amount of said first member during optical path switching;

a pair of guide shafts passing through said first member, a pair of side walls horizontally being provided at both ends of said guide shafts, and at least one compression coil being inserted in the drive shaft exploded between the first member and one of the side walls;

wherein said controller controls displacement amount of said first member based on a balance of a restoration force generated proportionally to the displacement and a force generated by said first driving mechanism.

11. An optical switch according to claim 10, further comprising a pair of leaf springs which hold said first member in a predetermined state by their biasing forces, the displacement amount of said first member being controlled by said controller based on a balance of a restoration force generated proportionally to the displacement and a force generated by said first driving mechanism.

12. An optical switch according to claim 10, said second member comprising:

first V shaped grooves holding the second optical fibers, second V shaped grooves being positioned before the end portion of the second optical fibers held by the first V shaped grooves and introducing the first optical fiber to the end portion of one of the second optical fibers.

* * * * *